(12) United States Patent
Asmus et al.

(10) Patent No.: US 12,400,046 B2
(45) Date of Patent: Aug. 26, 2025

(54) CENTRAL PLANT OPTIMIZATION SYSTEM WITH SCALABLE ASSET MODELS

(71) Applicant: Tyco Fire & Security GmbH, Neuhausen am Rheinfall (CH)

(72) Inventors: Matthew J. Asmus, Watertown, WI (US); Steven R. Vitullo, Shorewood, WI (US); Steven C. Snyder, Jenkintown, PA (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 1058 days.

(21) Appl. No.: 17/334,524

(22) Filed: May 28, 2021

(65) Prior Publication Data

US 2022/0229945 A1    Jul. 21, 2022

Related U.S. Application Data

(60) Provisional application No. 63/139,919, filed on Jan. 21, 2021.

(51) Int. Cl.
| | | |
|---|---|---|
| *G06F 30/13* | (2020.01) | |
| *G05B 13/04* | (2006.01) | |
| *G06Q 10/06* | (2023.01) | |

(52) U.S. Cl.
CPC ........... *G06F 30/13* (2020.01); *G05B 13/044* (2013.01); *G06Q 10/06* (2013.01)

(58) Field of Classification Search
CPC .......... G06F 30/13; G06F 30/18; G06F 30/28; G06F 2119/08; G05B 13/044; G06Q 10/06; G06Q 50/06; G06Q 50/163
See application file for complete search history.

(56) References Cited

U.S. PATENT DOCUMENTS

| | | | |
|---|---|---|---|
| 7,050,866 B2 * | 5/2006 | Martin | ................... G05B 17/02 703/2 |
| 9,447,985 B2 | 9/2016 | Johnson | |

(Continued)

FOREIGN PATENT DOCUMENTS

| | | |
|---|---|---|
| CA | 2957726 A1 | 3/2016 |
| CA | 3043996 A1 | 2/2018 |

(Continued)

OTHER PUBLICATIONS

Chandam, V., et al. "Modeling and Optimization of a Combined Cooling, Heating and Power Plant System" American Control Conf., pp. 3069-3074 (2012) (Year: 2012).*

(Continued)

*Primary Examiner* — Jay Hann
(74) *Attorney, Agent, or Firm* — Foley & Lardner LLP

(57) ABSTRACT

A system includes processors configured to perform operations including obtaining a base design resource production of a building asset and a base resource production data set comprising a base resource production of the building asset at a plurality of operating points, calculating a scaled resource production data set comprising a scaled resource production of the building asset at the plurality of operating points by scaling the base resource production data set based on a new design resource production of the building asset relative to the base design resource production of the building asset, generating a resource consumption data set comprising a resource consumption of the building asset at the plurality of operating points based on the scaled resource production data set, and initiating an automated action based on the scaled resource production data set and the resource consumption data set.

20 Claims, 12 Drawing Sheets

(56) References Cited

U.S. PATENT DOCUMENTS

| | | | |
|---|---|---|---|
| 10,871,756 B2 | 12/2020 | Johnson et al. | |
| 10,908,578 B2 | 2/2021 | Johnson et al. | |
| 10,921,768 B2 | 2/2021 | Johnson et al. | |
| 11,156,978 B2 | 10/2021 | Johnson et al. | |
| 2003/0055798 A1 | 3/2003 | Hittle et al. | |
| 2019/0072943 A1* | 3/2019 | Przybylski | G05B 19/41885 |
| 2019/0107825 A1 | 4/2019 | Wenzel et al. | |
| 2019/0302709 A1* | 10/2019 | Vitullo | G06F 17/18 |

FOREIGN PATENT DOCUMENTS

| | | |
|---|---|---|
| EP | 1 156 286 A2 | 11/2001 |
| EP | 3 186 687 A4 | 7/2017 |
| EP | 3 497 377 A1 | 6/2019 |
| WO | WO-2012/161804 A1 | 11/2012 |
| WO | WO-2013/130956 A1 | 9/2013 |

OTHER PUBLICATIONS

Li, X. & Wen, J. "Review of building energy modeling for control and operation" Renewable & Sustainable Energy Reviews, vol. 37, pp. 517-537 (2014) (Year: 2014).*

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Mosaic Christian Church a Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

(56) References Cited

OTHER PUBLICATIONS

Afram et al., "Theory and Application of HVAC Control Systems—A review of Model Predictive Control (MPC)," Building and Environment, Feb. 2014, vol. 72 (pp. 343-355).
Ahn et al., "Optimal Control Development for Chilled Water Plants Using a Quadratic Representation," Energy and Buildings, Apr. 2001, vol. 33, No. 4 (pp. 371-378).
Burer et al., "Non-convex Mixed-Integer Nonlinear Programming: A Survey," Surveys in Operations Research and Management Science, Jul. 2012, vol. 17, No. 2 (pp. 97-106).
Cantoni, A., "Optimal Curve Fitting with Piecewise Linear Functions," IEEE Transactions on Computers, Jan. 1971, vol. 20, No. (pp. 59-67).
Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).
Drgona et al., "All you Need to Know about Model Predictive Control for Buildings," Annual Reviews in Control, 2020, vol. 50 (pp. 190-232).
EPO Notice of Opposition to a European Patent issued in Appl. Ser. No. EP 16165681.4 dated May 2, 2023 (48 pages).
EPO Notice of Opposition to a European Patent issued in Appl. Ser. No. EP 16165681.4 dated May 2, 2023 (51 pages).
EPO Notice of Opposition to a European Patent with Consolidated List issued in EP Appl. Ser. No. 16165681.4 dated May 2, 2023 (4 pages).
EPO Office Action on EP Appl. Ser. No. 16165681.4 dated Apr. 6, 2021 (7 pages).
Extended European Search Report on EP Appl. Ser. No. 16165681.4 dated Oct. 20, 2016 (5 pages).
Extended European Search Report on EP Appl. Ser. No. 22177772.5 dated Sep. 26, 2022 (11 pages).
Hackner, J.R., "HVAC system dynamics and energy use in existing buildings," Doctoral Dissertation, University of Madison, Wisconsin, 1984 (174 pages).
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
Kelman et al., "Analysis of Local Optima in Predictive Control for Energy Efficient Buildings," Journal of Building Performance Simulation, Apr. 16, 2012, vol. 6, No. 3 (pp. 236-255).
Koehler et al., "Building Temperature Distributed Control via Explicit MPC and 'Trim and Respond' Methods," European Control Conference (ECC), Jul. 17-19, 2013, Zurich, Switzerland (pp. 4334-4339).
Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17- 20, 2013 (pp. 442-447).
McKenna et al., "A TRNSYS model of a building HVAC system with GSHP and PCM thermal energy storage-component modelling and validation," Proceedings of BS2013: 13th Conference of International Building Performance Simulation Association, Chambéry, France, Aug. 26-28, 2013 (pp. 3336-3343).
Mossolly et al., "Optimal Control Strategy for a Multizone Air Conditioning System Using a Genetic Algorithm," Energy, Jan. 2009, vol. 34, No. 1 (pp. 58-66).
Nassif et al., "Optimization of HVAC Control System Strategy Using Two-Objective genetic Algorithm," International Journal of HVA C&R Research, vol. 11, No. 3 (pp. 459-486).
Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).
Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).
Strurznegger, D., "Model Predictive Building Climate Control, Steps Towards Practice," Doctoral Thesis, Automatic Control Laboratory, Zurich, Switzerland, 2014 (176 pages).
Sun et al., Optimal Control of Building HVAC&R Systems Using Complete Simulation-Based Sequential Quadratic Programming (CSB-SQP), Building and Environment, May 2005, vol. 40, No. 5 (pp. 657-669).
Third Party Observation Report on EP Appl. Ser. No. 16165681.4 dated Jan. 15, 2020 (8 pages).
Third Party Observation Report on EP Appl. Ser. No. 16165681.4 dated Oct. 5, 2018 (6 pages).
Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).
Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).
Wang et al., "Model-Based Optimal Control of VAV Air-Conditioning System Using Genetic Algorithm," Building and Environment, Aug. 2000, vol. 35, No. 6 (pp. 471-487).
Wang et al., "Supervisory and Optimal Control of Building HVAC Systems: A Review," HVAC&R Research, Jan. 2008, vol. 14, No. 1 (pp. 3-32).
Xi et al., "Support Vector Regression Model Predictive Control on a HVAC Plant," Control Engineering Practice, Aug. 2007, vol. 15, No. 8 (pp. 897-908).
Yao et al., "Global Optimization of a Central Air-Conditioning System Using Decomposition-Coordination Method," Energy and Buildings, May 2010, vol. 42, No. 5 (pp. 570-583).

* cited by examiner

CENTRAL PLANT OPTIMIZATION SYSTEM WITH SCALABLE ASSET MODELS

CROSS-REFERENCE TO RELATED PATENT APPLICATION

This application claims the benefit of and priority to U.S. Provisional Patent Application No. 63/139,919, filed Jan. 21, 2021, which is incorporated herein by reference in its entirety.

BACKGROUND

The present disclosure relates generally to modeling building assets, such as for simulating operations of a central plant and/or building equipment.

A central plant may include various types of equipment configured to serve the thermal energy loads of a building or campus (i.e., a system of buildings). For example, a central plant may include heaters, chillers, heat recovery chillers, cooling towers, or other types of equipment configured to provide heating or cooling for the building. A central plant may consume resources from a utility (e.g., electricity, water, natural gas, etc.) to heat or cool a working fluid (e.g., water, glycol, etc.) that is circulated to the building or stored for later use to provide heating or cooling for the building. Fluid conduits typically deliver the heated or chilled fluid to air handlers located on the rooftop of the building or to individual floors or zones of the building. The air handlers push air past heat exchangers (e.g., heating coils or cooling coils) through which the working fluid flows to provide heating or cooling to the air. The working fluid then returns to the central plant to receive further heating or cooling and the cycle continues.

Similarly, various types of equipment (e.g., heaters, chillers, heat recovery chillers, cooling towers, etc.) may be that provide heating or cooling to a building or site separate from a central plant. For example, many buildings have some form of HVAC equipment operating to affect indoor air temperatures and/or quality for the building. High efficiency equipment can help reduce the amount of energy consumed by a central plant or a building, thereby lowering operating costs and potentially increasing occupant comfort. Accordingly, in some cases, it may be beneficial to update or reconfigure a site (e.g., a building, a central plant, etc.) with new or state-of-the art equipment (e.g., chillers, pumps, etc.), which may be more energy efficient that older units. Additionally, it may be beneficial to replace small or undersized equipment with larger units to increase efficiency or to meet demands.

SUMMARY

One implementation of the present disclosure is a system that includes one or more memory devices having instructions stored thereon that, when executed by one or more processors, cause the one or more processors to perform operations including obtaining a base design resource production of a building asset and a base resource production data set including a base resource production of the building asset at a plurality of operating points, calculating a scaled resource production data set including a scaled resource production of the building asset at the plurality of operating points by scaling the base resource production data set based on a new design resource production of the building asset relative to the base design resource production of the building asset, generating a resource consumption data set including a resource consumption of the building asset at the plurality of operating points based on the scaled resource production data set, and initiating an automated action based on the scaled resource production data set and the resource consumption data set.

In some embodiments, the operations further include obtaining a base coefficient of performance (COP) data set including a base COP of the building asset at the plurality of operating points and calculating a new COP data set including a new COP of the building asset at the plurality of operating points by adjusting the base COP data set.

In some embodiments, adjusting the base COP data set includes determining a delta between a base COP of the building asset at base design conditions and a new COP of the building asset at new design conditions and adjusting the base COP of the building asset at the plurality of operating points based on the delta between the base COP of the building asset at base design conditions and the new COP of the building asset at new design conditions.

In some embodiments, generating the new resource consumption data set includes calculating the new resource consumption of the building asset at the plurality of operating points based on the scaled resource production of the building asset at the plurality of operating points and the new COP of the building asset at the plurality of operating points.

In some embodiments, the base design resource consumption and the base design resource production of the building asset correspond to a resource consumption and a resource production of the building asset at full load.

In some embodiments, the building asset includes at least one of a water-cooled chiller, a heat recovery chiller, a dual-compressor chiller, a steam-driven chiller, an air-cooled chiller, a steam absorption chiller, a double bundle heat recovery chiller, a heat pump chiller, a cooling tower, a boiler, a heater, a steam generator, an air handling unit, or a rooftop unit.

In some embodiments, the automated action includes generating a predictive model that defines a relationship between the scaled resource production of the building asset and the resource consumption of the building asset and using the predictive model to predict a future resource consumption of the building asset as a function of a future resource production of the building asset.

In some embodiments, the automated action includes controlling building equipment based on operational parameters predicted to achieve the future resource consumption or the future resource production.

Another implementation of the present disclosure is a method including obtaining a base design resource production of a building asset and a base resource production data set including a base resource production of the building asset at a plurality of operating points, calculating a scaled resource production data set including a scaled resource production of the building asset at the plurality of operating points by scaling the base resource production data set based on a new design resource production of the building asset relative to the base design resource production of the building asset, generating a resource consumption data set including a resource consumption of the building asset at the plurality of operating points based on the scaled resource production data set, and initiating an automated action based on the scaled resource production data set and the resource consumption data set.

In some embodiments, the method further includes obtaining a base coefficient of performance (COP) data set including a base COP of the building asset at the plurality of operating points and calculating a new COP data set including a new COP of the building asset at the plurality of operating points by adjusting the base COP data set.

In some embodiments, adjusting the base COP data set includes determining a delta between a base COP of the building asset at base design conditions and a new COP of the building asset at new design conditions and adjusting the base COP of the building asset at the plurality of operating points based on the delta between the base COP of the building asset at base design conditions and the new COP of the building asset at new design conditions.

In some embodiments, generating the new resource consumption data set includes calculating the new resource consumption of the building asset at the plurality of operating points based on the scaled resource production of the building asset at the plurality of operating points and the new COP of the building asset at the plurality of operating points.

In some embodiments, the design base resource consumption and the design base resource production of the building asset correspond to a resource consumption and a resource production of the building asset at full load.

In some embodiments, the building asset includes at least one of a water-cooled chiller, a heat recovery chiller, a dual-compressor chiller, a steam-driven chiller, an air-cooled chiller, a steam absorption chiller, a double bundle heat recovery chiller, a heat pump chiller, a cooling tower, a boiler, a heater, a steam generator, an air handling unit, or a rooftop unit.

In some embodiments, the automated action includes generating a predictive model that defines a relationship between the scaled resource production of the building asset and the resource consumption of the building asset and using the predictive model to predict a future resource consumption of the building asset as a function of a future resource production of the building asset.

In some embodiments, the automated action includes controlling building equipment based on operational parameters predicted to achieve the future resource consumption or the future resource production.

Yet another implementation of the present disclosure is a non-transitory computer-readable medium having instructions stored thereon that, when executed by one or more processors, cause the one or more processors to obtain a base design resource production of a building asset and a base resource production data set including a base resource production of the building asset at a plurality of operating points, calculate a scaled resource production data set including a scaled resource production of the building asset at the plurality of operating points by scaling the base resource production data set based on a new design resource production of the building asset relative to the base design resource production of the building asset, generate a resource consumption data set including a resource consumption of the building asset at the plurality of operating points based on the scaled resource production data set, and initiate an automated action based on the scaled resource production data set and the resource consumption data set.

In some embodiments, the instructions further cause the one or more processors to obtain a base coefficient of performance (COP) data set including a base COP of the building asset at the plurality of operating points and calculate a new COP data set including a new COP of the building asset at the plurality of operating points by adjusting the base COP data set.

In some embodiments, the automated action includes generating a predictive model that defines a relationship between the scaled resource production of the building asset and the resource consumption of the building asset and using the predictive model to predict a future resource consumption of the building asset as a function of a future resource production of the building asset.

In some embodiments, the automated action includes controlling building equipment based on operational parameters predicted to achieve the future resource consumption or the future resource production.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
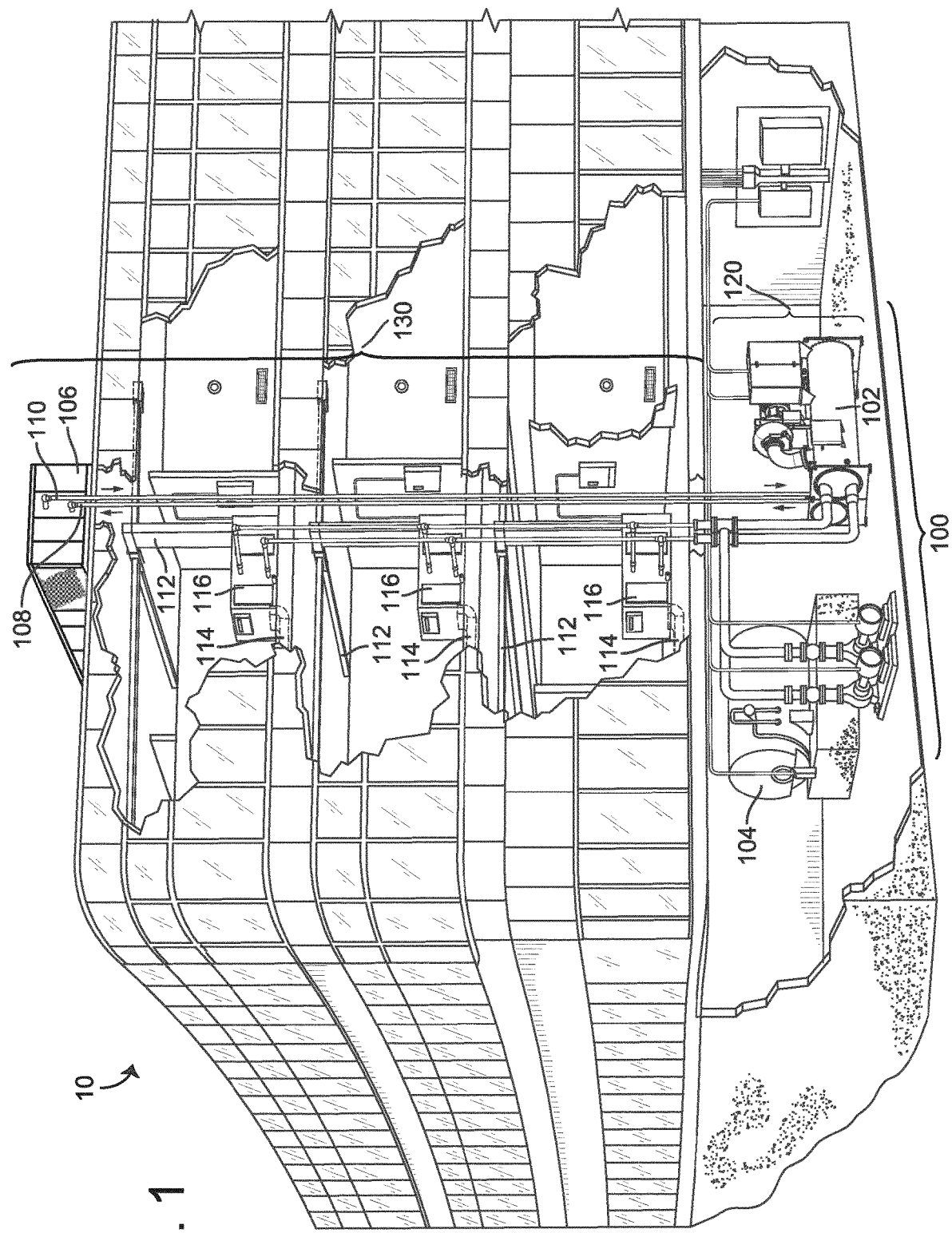
FIG. 1 is a drawing of a building equipped with a HVAC system, according to some embodiments.

Referring generally to the FIGURES, systems and methods for executing scalable building assets models are shown, according to some embodiments. Building assets can be any equipment or device included in a building or a central plant, and in some cases can include at least equipment designed to affect an indoor air quality of a building. For example, building assets can include HVAC equipment (e.g., heaters, chillers, air handling units, pumps, fans, thermal energy storage, etc.) configured to provide heating, cooling, ventilation, or other services for a building.

In some embodiments, building assets are included in a central plant configured to serve the thermal energy loads of a building or campus (i.e., a system of buildings). For example, a central plant may include heaters, chillers, heat recovery chillers, cooling towers, or other types of equipment configured to provide heating or cooling for the building or campus. The central plant equipment may be divided into various groups configured to perform a particular function. Such groups of central plant equipment are referred to herein as subplants. For example, a central plant may include a heater subplant, a chiller subplant, a heat recovery chiller subplant, a cold thermal energy storage subplant, a hot thermal energy storage subplant, etc. The subplants may consume resources from one or more utilities (e.g., water, electricity, natural gas, etc.) to serve the energy loads of the building or campus.

In some embodiments, central plant operations may be optimized to meet various demands, such as chiller water loads, hot water loads, steam loads, electrical loads, etc., while minimizing the cost and energy required to meet these loads. In some embodiments, a central plant controller includes components to perform such optimizations, including a high level optimizer and a low level optimizer, during operations of the central plant and/or in real time. The central plant controller may predict what the aforementioned loads will be in the future. In particular, the high level optimizer determines what subsystems (chillers, heat recovery chillers, cooling towers, boilers, heat exchanges, etc.) to run to meet those loads at the most optimal cost. The low level optimizer determines within each sub system what equipment will run and what percentage of full load to minimize energy consumption.

In some embodiments, a planning system may also generate operating predictions for new or existing central plants, and/or for any other new or existing site including building assets. In particular, a planning system may be used to optimize central plant or equipment operations prior to initialization (i.e., prior to operating the central plant) or during operations. For example, the planning system may be utilized to predict the effects of adding or replacing certain central plant assets, and/or may be utilized to predict various operating parameters of a particular building asset. The planning system could be utilized to predict central plant and/or individual asset energy consumption, and thereby operating costs, with the addition or replacement of said assets. For example, the planning system could be utilized to predict the energy consumption of each individual chiller within a central plant, and could be used to predict energy consumption if one of the chillers is replaced with a newer and/or larger capacity unit.

In some embodiments, the planning system may include high level and low level optimizers, similar to the central plant controller, that generate said predictions. For low level optimization, the planning system can calculate a power consumption of each individual asset (e.g., chillers, cooling towers, pumps, etc.). In some embodiments, the low level optimizer may access asset models that represent a corresponding asset (e.g., equipment). For example, the planning tool may obtain one or more models to represent chillers associated with a central plant, and may execute the models to predict parameters such as chiller energy consumption.

In some embodiments, various coefficients of the asset models may be scaled to accommodate various asset parameters, such as capacity, power, etc. For example, a chiller model may include various coefficients that are scaled based on the design power and/or capacity of a chiller. When a new central plant configuration is optimized (e.g., predicting the replacement of a chiller), a default set of asset model coefficients may be scaled based on the design parameters of the new and/or existing assets, due to lack of actual operating data or lack of manufacturer data for the specific asset.

However, scaling asset model coefficients does not always provide an accurate prediction, particularly between variations of central plant assets. For example, scaling asset model coefficients for a constant speed chiller may not lead to accurate results when predicting values for a variable speed chiller. Additionally, in some cases, sufficient historical data (e.g., historical operating data of an existing building asset) is not available and/or is too expensive to collect prior to executing asset models to generate predictions. Accordingly, according to various illustrative implementations, the planning system described herein may implement a method of scaling a data set for predicting parameters of a new asset, rather than scaling coefficients of an asset model. Advantageously, the methods implemented by the planning system and described herein may provide more accurate estimations or predictions of asset operations using a limited number of input parameters (e.g., design load and power), without requiring large amounts of historical data.

While the present disclosure discusses various features in relation to central plants, it should be understood that the features of the present disclosure can also be used in relation to building equipment that is not necessarily located in or a part of a central plant of a building. For example, one or more pieces of building equipment (e.g., chillers) may be located outside of or otherwise not be a part of a central plant of a building, and the features of the present disclosure may be used for such building equipment. All such modifications are contemplated within the scope of the present disclosure.

Building and HVAC System

Referring now to FIG. 1, a perspective view of a building 10 is shown. Building 10 can be served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 may include a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 can be replaced with or supplemented by a central plant or central energy facility (described in greater detail with reference to FIG. 2). An example of an airside system which can be used in HVAC system 100 is described in greater detail with reference to FIG. 3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Central Plant

Figure 2:
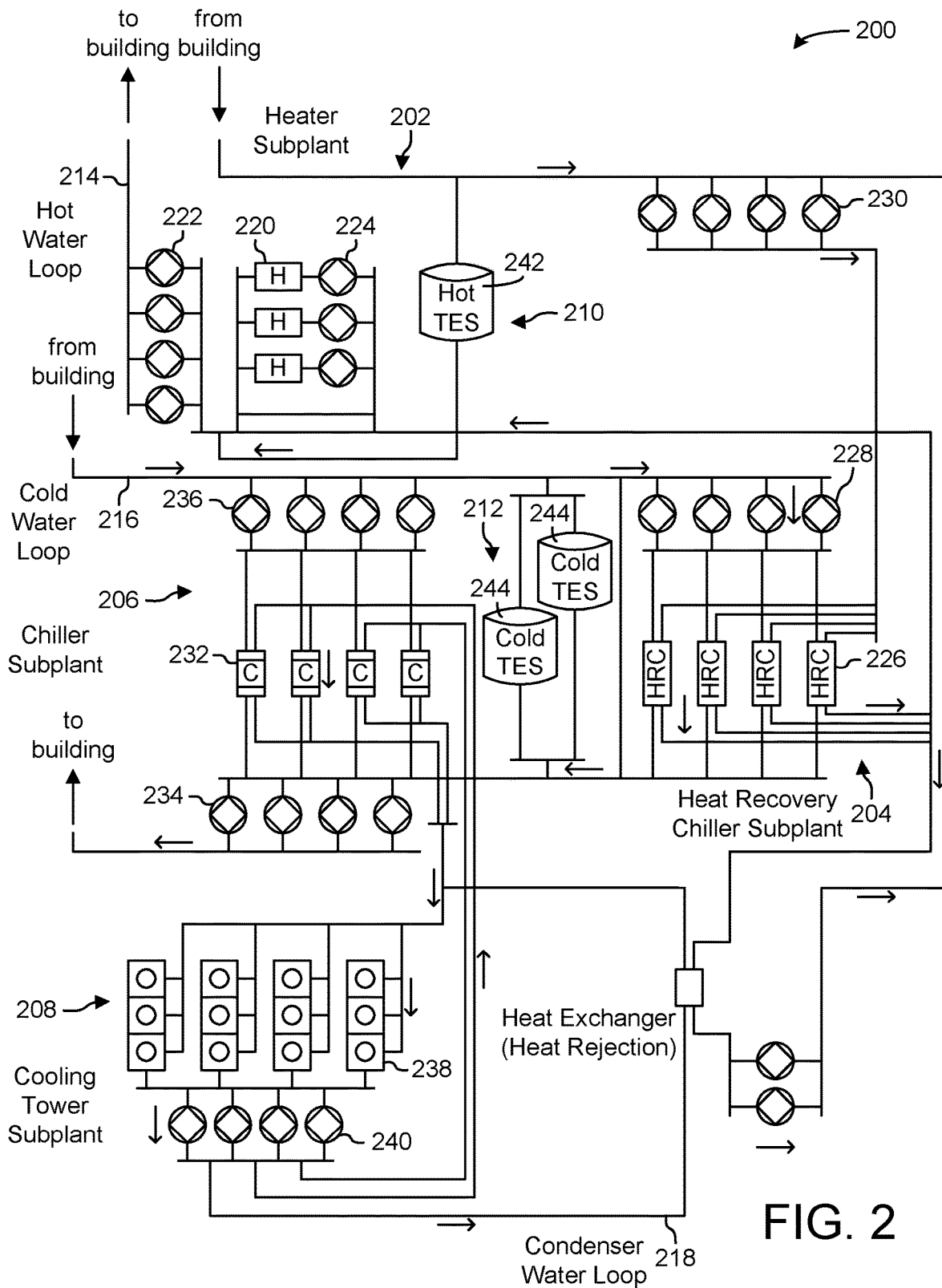
FIG. 2 is a block diagram of a central plant which can be used to serve the energy loads of the building of FIG. 1, according to some embodiments.

Referring now to FIG. 2, a block diagram of a central plant 200 is shown, according to some embodiments. In various embodiments, central plant 200 can supplement or replace waterside system 120 in HVAC system 100 or can be implemented separate from HVAC system 100. When implemented in HVAC system 100, central plant 200 can include a subset of the HVAC devices in HVAC system 100 (e.g., boiler 104, chiller 102, pumps, valves, etc.) and may operate to supply a heated or chilled fluid to AHU 106. The HVAC devices of central plant 200 can be located within building 10 (e.g., as components of waterside system 120) or at an offsite location such as a central energy facility that serves multiple buildings.

Central plant 200 is shown to include a plurality of subplants 202-208. Subplants 202-208 can be configured to convert energy or resource types (e.g., water, natural gas, electricity, etc.). For example, subplants 202-208 are shown to include a heater subplant 202, a heat recovery chiller subplant 204, a chiller subplant 206, and a cooling tower subplant 208. In some embodiments, subplants 202-208 consume resources purchased from utilities to serve the energy loads (e.g., hot water, cold water, electricity, etc.) of a building or campus. For example, heater subplant 202 can be configured to heat water in a hot water loop 214 that circulates the hot water between heater subplant 202 and building 10. Similarly, chiller subplant 206 can be configured to chill water in a cold water loop 216 that circulates the cold water between chiller subplant 206 building 10.

Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. In various embodiments, central plant 200 can include an electricity subplant (e.g., one or more electric generators) configured to generate electricity or any other type of subplant configured to convert energy or resource types.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-208 to receive further heating or cooling.

Although subplants 202-208 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-208 may provide heating and/or cooling directly to the building or campus without requiring an intermediate heat transfer fluid. These and other variations to central plant 200 are within the teachings of the present disclosure.

Each of subplants 202-208 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

In some embodiments, one or more of the pumps in central plant 200 (e.g., pumps 222, 224, 228, 230, 234, 236, and/or 240) or pipelines in central plant 200 include an isolation valve associated therewith. Isolation valves can be integrated with the pumps or positioned upstream or downstream of the pumps to control the fluid flows in central plant 200. In various embodiments, central plant 200 can include more, fewer, or different types of devices and/or subplants based on the particular configuration of central plant 200 and the types of loads served by central plant 200.

Still referring to FIG. 2, central plant 200 is shown to include hot thermal energy storage (TES) 210 and cold thermal energy storage (TES) 212. Hot TES 210 and cold TES 212 can be configured to store hot and cold thermal energy for subsequent use. For example, hot TES 210 can include one or more hot water storage tanks 242 configured to store the hot water generated by heater subplant 202 or heat recovery chiller subplant 204. Hot TES 210 may also include one or more pumps or valves configured to control the flow rate of the hot water into or out of hot TES tank 242.

Similarly, cold TES 212 can include one or more cold water storage tanks 244 configured to store the cold water generated by chiller subplant 206 or heat recovery chiller subplant 204. Cold TES 212 may also include one or more pumps or valves configured to control the flow rate of the cold water into or out of cold TES tanks 244. In some embodiments, central plant 200 includes electrical energy storage (e.g., one or more batteries) or any other type of device configured to store resources. The stored resources can be purchased from utilities, generated by central plant 200, or otherwise obtained from any source.

Airside System

Figure 3:
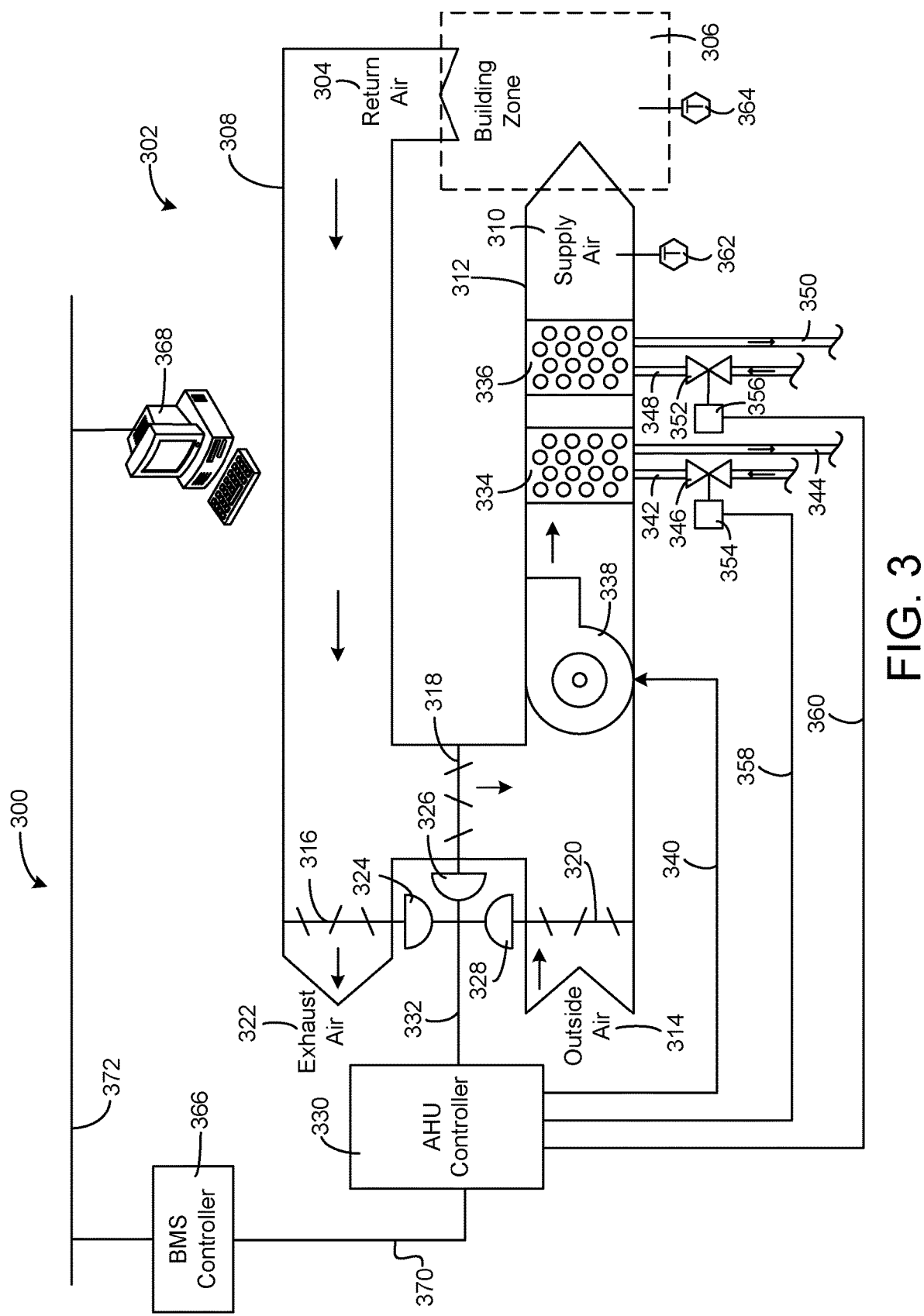
FIG. 3 is a block diagram of an airside system which can be implemented in the building of FIG. 1 and as part of the central plant of FIG. 2, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by central plant 200.

Airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from central plant 200 (e.g., from cold water loop 216) via piping 342 and may return the chilled fluid to central plant 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from central plant 200 (e.g., from hot water loop 214) via piping 348 and may return the heated fluid to central plant 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, central plant 200, HVAC system 100, and/or other controllable systems that serve building 10. BMS controller 366 may communicate with multiple downstream building systems or subsystems (e.g., HVAC system 100, a security system, a lighting system, central plant 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Central Plant Controller

Figure 4:
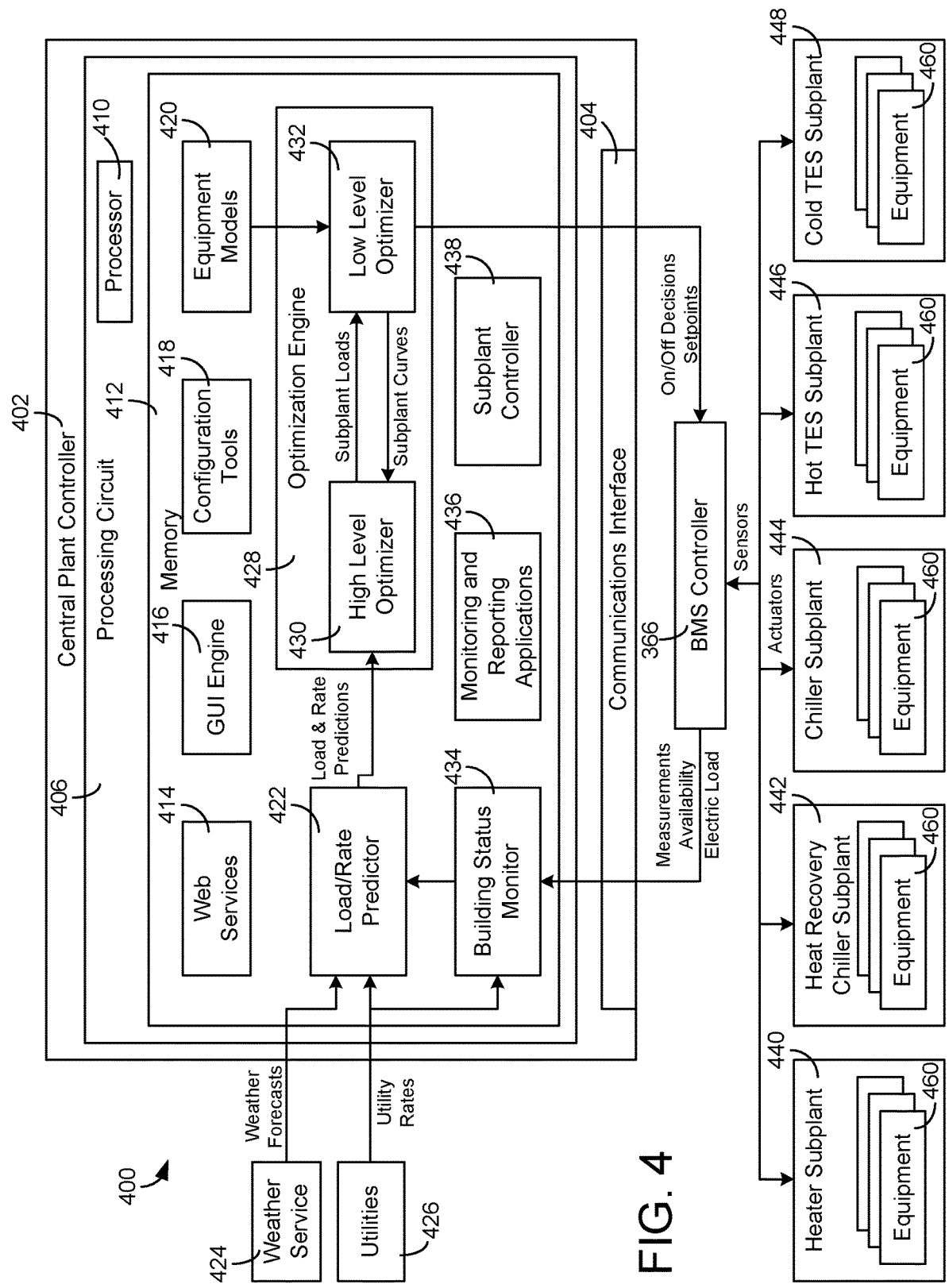
FIG. 4 is a block diagram illustrating a central plant system including a central plant controller that may be used to control the central plant of FIG. 2, according to an exemplary embodiment.

Referring now to FIG. 4, a block diagram illustrating a central plant system 400 is shown, according to some embodiments. System 400 is shown to include a central plant controller 402, BMS controller 366, and a plurality of subplants 440-448. Subplants 440-448 may be the same as any of the subplants or subsystems previously described with reference to FIGS. 1-3. For example, subplants 440-448 are shown to include a heater subplant 440, a heat recovery chiller subplant 442, a chiller subplant 444, a hot TES subplant 446, and a cold TES subplant 448.

Each of subplants 440-448 is shown to include equipment 460 that can be controlled by central plant controller 402 and/or BMS controller 366 to optimize the performance of central plant 200. Equipment 460 may include, for example, heating elements 220, chillers 232, heat recovery heat exchangers 226, cooling towers 238, thermal energy storage devices 242 and 244, pumps 222, 230, and 240, valves 224, 228, 234, and 236, and/or other devices of subplants 440-448. Individual devices of equipment 460 can be turned on or off to adjust the thermal energy load served by each of subplants 440-448. In some embodiments, individual devices of equipment 460 can be operated at variable capacities (e.g., operating a chiller at 10% capacity or 60% capacity) according to an operating setpoint received from central plant controller 402.

In some embodiments, one or more of subplants 440-448 includes a subplant level controller configured to control the equipment 460 of the corresponding subplant. For example, central plant controller 402 may determine an on/off configuration and global operating setpoints for equipment 460. In response to the on/off configuration and received global operating setpoints, the subplant controllers may turn individual devices of equipment 460 on or off, and implement specific operating setpoints (e.g., damper position, vane position, fan speed, pump speed, etc.) to reach or maintain the global operating setpoints.

BMS controller 366 may be configured to monitor conditions within a controlled building or building zone. For example, BMS controller 366 may receive input from various sensors (e.g., temperature sensors, humidity sensors, airflow sensors, voltage sensors, etc.) distributed throughout the building and may report building conditions to central plant controller 402. Building conditions may include, for example, a temperature of the building or a zone of the building, a power consumption (e.g., electric load) of the building, a state of one or more actuators configured to affect a controlled state within the building, or other types of information relating to the controlled building. BMS controller 366 may operate subplants 440-448 to affect the monitored conditions within the building and to serve the thermal energy loads of the building.

BMS controller 366 may receive control signals from central plant controller 402 specifying on/off states and/or setpoints for equipment 460. BMS controller 366 may control equipment 460 (e.g., via actuators, power relays, etc.) in accordance with the control signals provided by central plant controller 402. For example, BMS controller 366 may operate equipment 460 using closed loop control to achieve the setpoints specified by central plant controller 402. In various embodiments, BMS controller 366 may be combined with central plant controller 402 or may be part of a separate building management system. According to an exemplary embodiment, BMS controller 366 is a META-SYS® brand building management system, as sold by Johnson Controls, Inc.

Central plant controller 402 may monitor the status of the controlled building using information received from BMS controller 366. Central plant controller 402 may be configured to predict the thermal energy loads (e.g., heating loads, cooling loads, etc.) of the building for plurality of time steps in a prediction window (e.g., using weather forecasts from a weather service). Central plant controller 402 may generate on/off decisions and/or setpoints for equipment 460 to minimize the cost of energy consumed by subplants 440-448 to serve the predicted heating and/or cooling loads for the duration of the prediction window. According to an exemplary embodiment, central plant controller 402 is integrated within a single computer (e.g., one server, one housing, etc.). In various other exemplary embodiments, central plant controller 402 can be distributed across multiple servers or computers (e.g., that can exist in distributed locations). In another exemplary embodiment, central plant controller 402 may be integrated with a smart building manager that manages multiple building systems and/or combined with BMS controller 366.

Central plant controller 402 is shown to include a communications interface 404 and a processing circuit 406. Communications interface 404 may include wired or wireless interfaces (e.g., jacks, antennas, transmitters, receivers, transceivers, wire terminals, etc.) for conducting data communications with various systems, devices, or networks. For example, communications interface 404 may include an Ethernet card and port for sending and receiving data via an Ethernet-based communications network and/or a WiFi transceiver for communicating via a wireless communications network. Communications interface 404 may be configured to communicate via local area networks or wide area networks (e.g., the Internet, a building WAN, etc.) and may use a variety of communications protocols (e.g., BACnet, IP, LON, etc.).

Communications interface 404 may be a network interface configured to facilitate electronic data communications between central plant controller 402 and various external systems or devices (e.g., BMS controller 366, subplants 440-448, etc.). For example, central plant controller 402 may receive information from BMS controller 366 indicating one or more measured states of the controlled building (e.g., temperature, humidity, electric loads, etc.) and one or more states of subplants 440-448 (e.g., equipment status, power consumption, equipment availability, etc.). Communications interface 404 may receive inputs from BMS controller 366 and/or subplants 440-448 and may provide operating parameters (e.g., on/off decisions, setpoints, etc.) to subplants 440-448 via BMS controller 366. The operating parameters may cause subplants 440-448 to activate, deactivate, or adjust a setpoint for various devices of equipment 460.

Still referring to FIG. 4, processing circuit 406 is shown to include a processor 410 and memory 412. Processor 410 may be a general purpose or specific purpose processor, an application specific integrated circuit (ASIC), one or more field programmable gate arrays (FPGAs), a group of processing components, or other suitable processing components. Processor 410 may be configured to execute computer code or instructions stored in memory 412 or received from other computer readable media (e.g., CDROM, network storage, a remote server, etc.).

Memory 412 may include one or more devices (e.g., memory units, memory devices, storage devices, etc.) for storing data and/or computer code for completing and/or facilitating the various processes described in the present disclosure. Memory 412 may include random access memory (RAM), read-only memory (ROM), hard drive storage, temporary storage, non-volatile memory, flash memory, optical memory, or any other suitable memory for storing software objects and/or computer instructions. Memory 412 may include database components, object code components, script components, or any other type of information structure for supporting the various activities and information structures described in the present disclosure. Memory 412 may be communicably connected to processor 410 via processing circuit 406 and may include computer code for executing (e.g., by processor 410) one or more processes described herein.

Still referring to FIG. 4, memory 412 is shown to include a building status monitor 434. Central plant controller 402 may receive data regarding the overall building or building space to be heated or cooled with central plant 200 via building status monitor 434. In an exemplary embodiment, building status monitor 434 may include a graphical user interface component configured to provide graphical user interfaces to a user for selecting building requirements (e.g., overall temperature parameters, selecting schedules for the building, selecting different temperature levels for different building zones, etc.).

Central plant controller 402 may determine on/off configurations and operating setpoints to satisfy the building requirements received from building status monitor 434. In some embodiments, building status monitor 434 receives, collects, stores, and/or transmits cooling load requirements, building temperature setpoints, occupancy data, weather data, energy data, schedule data, and other building parameters. In some embodiments, building status monitor 434 stores data regarding energy costs, such as pricing information available from utilities 426 (energy charge, demand charge, etc.).

Still referring to FIG. 4, memory 412 is shown to include a load/rate predictor 422. Load/rate predictor 422 may be configured to predict the thermal energy loads ($\hat{\ell}_k$) of the building or campus for each time step k (e.g., k=1 ... n) of an optimization period. Load/rate predictor 422 is shown receiving weather forecasts from a weather service 424. In some embodiments, load/rate predictor 422 predicts the thermal energy loads $\hat{\ell}_k$ as a function of the weather forecasts. In some embodiments, load/rate predictor 422 uses feedback from BMS controller 366 to predict loads $\hat{\ell}$. Feedback from BMS controller 366 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 422 receives a measured electric load and/or previous measured load data from BMS controller 366 (e.g., via building status monitor 434). Load/rate predictor 422 may predict loads $\hat{\ell}_k$ as a function of a given weather forecast ($\hat{\phi}_w$), a day type (day), the time of day (t), and previous measured load data ($Y_{k-1}$). Such a relationship is expressed in the following equation:

$$\hat{\ell}_k = f(\hat{\phi}_w, \text{day}, t | Y_{k-1})$$

In some embodiments, load/rate predictor 422 uses a deterministic plus stochastic model trained from historical load data to predict loads $\hat{\ell}_k$. Load/rate predictor 422 may use any of a variety of prediction methods to predict loads $\hat{\ell}_k$ (e.g., linear regression for the deterministic portion and an AR model for the stochastic portion). Load/rate predictor 422 may predict one or more different types of loads for the building or campus. For example, load/rate predictor 422 may predict a hot water load $\hat{\ell}_{Hot,k}$ and a cold water load $\hat{\ell}_{Cold,k}$ for each time step k within the prediction window.

Load/rate predictor 422 is shown receiving utility rates from utilities 426. Utility rates may indicate a cost or price per unit of a resource (e.g., electricity, natural gas, water, etc.) provided by utilities 426 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 426 or predicted utility rates estimated by load/rate predictor 422.

In some embodiments, the utility rates include demand charges for one or more resources provided by utilities 426. A demand charge may define a separate cost imposed by utilities 426 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, optimization engine 428 may be configured to account for demand charges in the high level optimization process performed by high level optimizer 430. Utilities 426 may be defined by time-variable (e.g., hourly)

prices, a maximum service level (e.g., a maximum rate of consumption allowed by the physical infrastructure or by contract) and, in the case of electricity, a demand charge or a charge for the peak rate of consumption within a certain period.

Load/rate predictor 422 may store the predicted loads $\hat{\ell}_k$ and the utility rates in memory 412 and/or provide the predicted loads $\hat{\ell}_k$ and the utility rates to optimization engine 428. Optimization engine 428 may use the predicted loads $\hat{\ell}_k$ and the utility rates to determine an optimal load distribution for subplants 440-448 and to generate on/off decisions and setpoints for equipment 460.

Still referring to FIG. 4, memory 412 is shown to include an optimization engine 428. Optimization engine 428 may perform a cascaded optimization process to optimize the performance of central plant 200. For example, optimization engine 428 is shown to include a high level optimizer 430 and a low level optimizer 432. High level optimizer 430 may control an outer (e.g., subplant level) loop of the cascaded optimization. High level optimizer 430 may determine an optimal distribution of thermal energy loads across subplants 440-448 for each time step in the prediction window in order to optimize (e.g., minimize) the cost of energy consumed by subplants 440-448. Various other features of high level optimizer 430 are described in greater detail in U.S. patent application Ser. No. 16/214,984, filed Dec. 12, 2018, and incorporated herein by reference in its entirety.

Low level optimizer 432 may control an inner (e.g., equipment level) loop of the cascaded optimization. Low level optimizer 432 may determine how to best run each subplant at the load setpoint determined by high level optimizer 430. For example, low level optimizer 432 may determine on/off states and/or operating setpoints for various devices of equipment 460 in order to optimize (e.g., minimize) the energy consumption of each subplant while meeting the thermal energy load setpoint for the subplant.

Memory 412 is also shown to include a subplant controller 438. Subplant controller 438 may store historical data regarding past operating statuses, past operating setpoints, and instructions for calculating and/or implementing control parameters for subplants 440-448. Subplant controller 438 may also receive, store, and/or transmit data regarding the conditions of individual devices of equipment 460, such as operating efficiency, equipment degradation, a date since last service, a lifespan parameter, a condition grade, or other device-specific data. Subplant controller 438 may receive data from subplants 440-448 and/or BMS controller 366 via communications interface 404. Subplant controller 438 may also receive and store on/off statuses and operating setpoints from low level optimizer 432.

Data and processing results from optimization engine 428, subplant controller 438, or other modules of central plant controller 402 may be accessed by (or pushed to) monitoring and reporting applications 436. Monitoring and reporting applications 436 may be configured to generate real time "system health" dashboards that can be viewed and navigated by a user (e.g., a central plant engineer). For example, monitoring and reporting applications 436 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across central plants in different buildings (real or modeled), different campuses, or the like. Other GUI elements or reports may be generated and shown based on available data that allow users to assess performance across one or more central plants from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the central plant.

Still referring to FIG. 4, central plant controller 402 may include one or more GUI servers, web services 414, or GUI engines 416 to support monitoring and reporting applications 436. In various embodiments, applications 436, web services 414, and GUI engine 416 may be provided as separate components outside of central plant controller 402 (e.g., as part of a smart building manager). Central plant controller 402 may be configured to maintain detailed historical databases (e.g., relational databases, XML, databases, etc.) of relevant data and includes computer code modules that continuously, frequently, or infrequently query, aggregate, transform, search, or otherwise process the data maintained in the detailed databases. Central plant controller 402 may be configured to provide the results of any such processing to other databases, tables, XML files, or other data structures for further querying, calculation, or access by, for example, external monitoring and reporting applications.

Central plant controller 402 is shown to include configuration tools 418. Configuration tools 418 can allow a user to define (e.g., via graphical user interfaces, via prompt-driven "wizards," etc.) how central plant controller 402 should react to changing conditions in the central plant subsystems. In an exemplary embodiment, configuration tools 418 allow a user to build and store condition-response scenarios that can cross multiple central plant devices, multiple building systems, and multiple enterprise control applications (e.g., work order management system applications, entity resource planning applications, etc.). For example, configuration tools 418 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 418 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Planning System

Figure 5A:
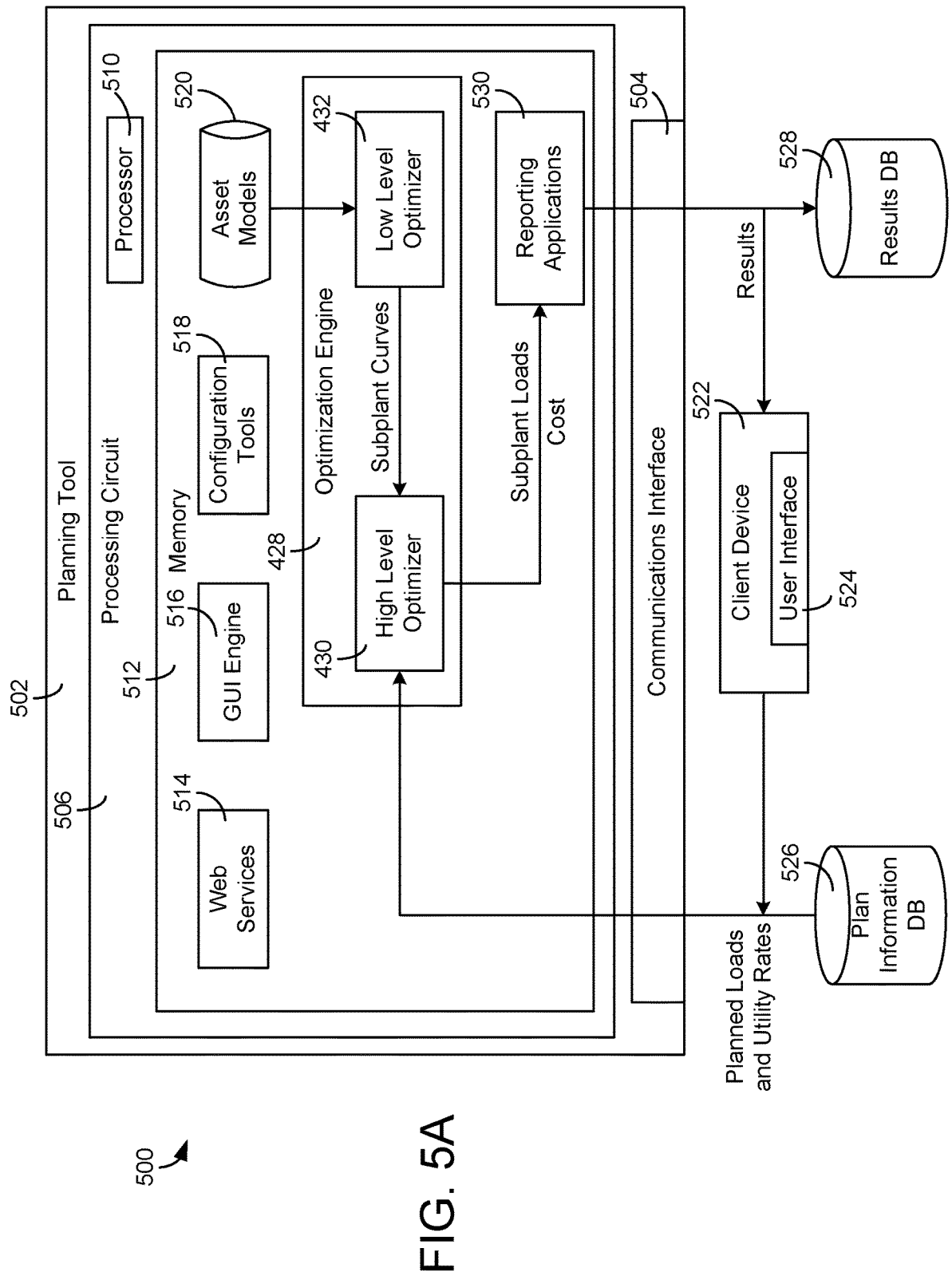
FIG. 5A is a block diagram of a planning system for predicting various operating parameters of building equipment, according to some embodiments.

Referring now to FIG. 5A, a block diagram of a planning system 500 is shown, according to some embodiments. Planning system 500 may be configured to use optimization engine 428 as part of a planning tool 502 to simulate the operation of a central plant over a predetermined time period (e.g., a day, a month, a week, a year, etc.) for planning, budgeting, and/or design considerations. In some embodiments, planning tool 502 can simulate operation of one or more particular building assets (e.g., chillers, boilers, etc.) over a predetermined time period.

When implemented in planning tool 502, optimization engine 428 may operate in a similar manner as described with reference to FIG. 4. For example, optimization engine 428 may use building loads and utility rates to determine an optimal subplant load distribution to minimize cost over a simulation period. However, planning tool 502 may not be responsible for real-time control of building asset. In some embodiments, planning system 500 and/or planning tool 502 may also be implemented via a BMS controller (e.g., BMS controller 366) to simulate operations of the BMS and equipment associated with the BMS. Accordingly, while planning system 500 is generally described herein with respect to central plant optimization, it will be appreciated that planning system 500 may also be utilized to optimize operations of a BMS and/or may be utilized to optimize operations of individual assets (e.g., equipment 460) that is not necessarily part of a central plant or BMS.

In planning tool 502, high level optimizer 430 may receive planned loads and utility rates for the entire simulation period. The planned loads and utility rates may be defined by input received from a user via a client device 522 (e.g., user-defined, user selected, etc.) and/or retrieved from a plan information database 526. High level optimizer 430 uses the planned loads and utility rates in conjunction with subplant curves from low level optimizer 432 to determine optimal subplant loads (i.e., an optimal dispatch schedule) for a portion of the simulation period.

The portion of the simulation period over which high level optimizer 430 optimizes the subplant loads may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, high level optimizer 430 requests all of the subplant curves used in the simulation from low level optimizer 432 at the beginning of the simulation. Since the planned loads and environmental conditions are known for the entire simulation period, high level optimizer 430 may retrieve all of the relevant subplant curves at the beginning of the simulation. In some embodiments, low level optimizer 432 generates functions that map subplant production to equipment level production and resource use when the subplant curves are provided to high level optimizer 430. These subplant to equipment functions may be used to calculate the individual equipment production and resource use (e.g., in a post-processing module) based on the results of the simulation.

Still referring to FIG. 5A, planning tool 502 is shown to include a communications interface 504 and a processing circuit 506. Communications interface 504 may include wired or wireless interfaces (e.g., jacks, antennas, transmitters, receivers, transceivers, wire terminals, etc.) for conducting data communications with various systems, devices, or networks. For example, communications interface 504 may include an Ethernet card and port for sending and receiving data via an Ethernet-based communications network and/or a WiFi transceiver for communicating via a wireless communications network. Communications interface 504 may be configured to communicate via local area networks or wide area networks (e.g., the Internet, a building WAN, etc.) and may use a variety of communications protocols (e.g., BACnet, IP, LON, etc.).

Communications interface 504 may be a network interface configured to facilitate electronic data communications between planning tool 502 and various external systems or devices (e.g., client device 522, results database 528, plan information database 526, etc.). For example, planning tool 502 may receive planned loads and utility rates from client device 522 and/or plan information database 526 via communications interface 504. Planning tool 502 may use communications interface 504 to output results of the simulation to client device 522 and/or to store the results in results database 528.

Processing circuit 506 is shown to include a processor 510 and memory 512. Processor 510 may be a general purpose or specific purpose processor, an application specific integrated circuit (ASIC), one or more field programmable gate arrays (FPGAs), a group of processing components, or other suitable processing components. Processor 510 may be configured to execute computer code or instructions stored in memory 512 or received from other computer readable media (e.g., CDROM, network storage, a remote server, etc.).

Memory 512 may include one or more devices (e.g., memory units, memory devices, storage devices, etc.) for storing data and/or computer code for completing and/or facilitating the various processes described in the present disclosure. Memory 512 may include random access memory (RAM), read-only memory (ROM), hard drive storage, temporary storage, non-volatile memory, flash memory, optical memory, or any other suitable memory for storing software objects and/or computer instructions. Memory 512 may include database components, object code components, script components, or any other type of information structure for supporting the various activities and information structures described in the present disclosure. Memory 512 may be communicably connected to processor 510 via processing circuit 506 and may include computer code for executing (e.g., by processor 510) one or more processes described herein.

Still referring to FIG. 5A, memory 512 is shown to include a GUI engine 516, web services 514, and configuration tools 518. In an exemplary embodiment, GUI engine 516 includes a graphical user interface component configured to provide graphical user interfaces to a user for selecting or defining plan information for the simulation (e.g., planned loads, utility rates, environmental conditions, etc.). Web services 514 may allow a user to interact with planning tool 502 via a web portal and/or from a remote system or device (e.g., an enterprise control application).

Configuration tools 518 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 518 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 526) and adapt it or enable it for use in the simulation.

Still referring to FIG. 5A, memory 512 is shown to include optimization engine 428. Optimization engine 428 may use the planned loads and utility rates to determine optimal subplant loads over a prediction window. The operation of optimization engine 428 may be the same or similar as previously described with reference to FIG. 4. With each iteration of the optimization process, optimization engine 428 may shift the prediction window forward and apply the optimal subplant loads for the portion of the simulation period no longer in the prediction window. Optimization engine 428 may use the new plan information at the end of the prediction window to perform the next iteration of the optimization process. Optimization engine 428 may output the applied subplant loads to reporting applications 530 for presentation to a client device 522 (e.g., via user interface 524) or storage in results database 528.

Reporting applications 530 may receive the optimized subplant loads from optimization engine 428 and, in some embodiments, costs associated with the optimized subplant loads. Reporting applications 530 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize subplant loads and the costs associated therewith and provide the results to a user via a GUI. The GUI elements may include charts or histograms that allow the user to visually analyze the results of the simulation.

Low-Level Optimization

As described above, high level central plant optimization determines what subsystems or equipment (e.g., chillers, heat recovery chillers, cooling towers, boilers, heat exchangers, etc.) to run to meet various central plant loads (e.g., chilled or hot water loads, steam loads, electrical loads, etc.) at a lowest cost or a lowest energy consumption. Low level central plant optimization can be used to determine, for each subsystem or for a set of equipment, the particular equipment that should run, and the parameters that the particular equipment should run at, to meet these central plant loads. It will be appreciate that the high and low level optimizations described herein are not limited to central plants, but may also be implemented in other systems, such as a BMS, to optimize operations of any sort of building equipment. Further, while the present disclosure describes the optimization as being bifurcated between low and high level optimization portions, it should be understood that, in some implementations, the features described as high level and low level optimization features may be performed by the same system/subsystem or by different systems/subsystems.

Figure 5B:
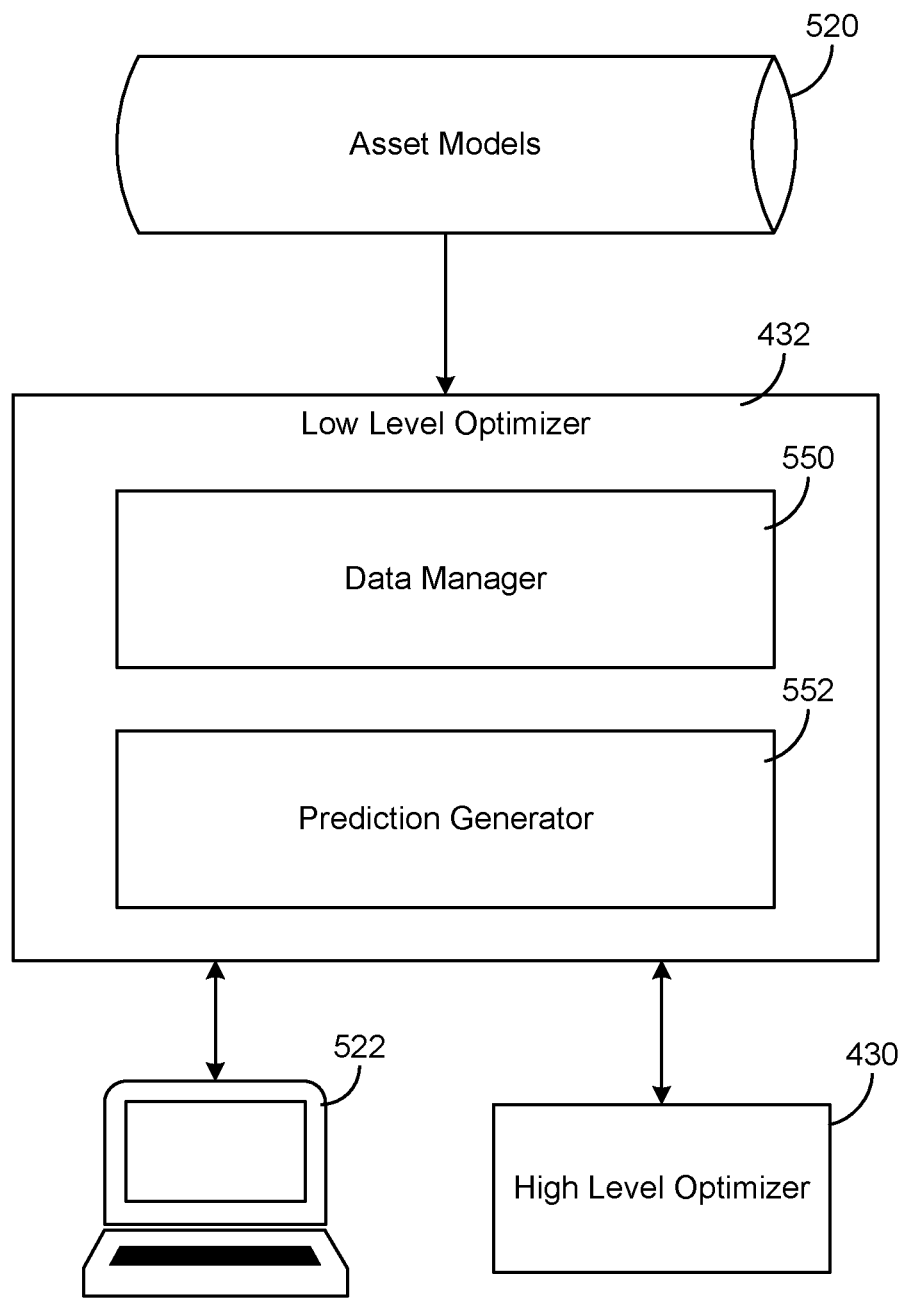
FIG. 5B is a block diagram of a low level optimizer of the planning tool of FIG. 5A in greater detail, according to some embodiments.

Referring now to FIG. 5B, a block diagram of low level optimizer 432 is shown in greater detail, according to some embodiments. In particular, FIG. 5B illustrates low level optimizer 432 implemented in planning tool 502. Accordingly, low level optimizer 432 may be configured to generate predictions for various parameters of different central plant and/or building assets (e.g., any of equipment 460 or any of the building devices described with respect to FIGS. 1-3). In particular, low level optimizer 432 may be configured to predict resource (e.g., energy) consumption for various assets. The predicted resource consumption for these assets can then be utilized (e.g., by high level optimizer 430) to generate predicted operating costs, for example.

Low level optimizer 432 is shown to include a data manager 550, configured to receive and/or obtain (e.g., by a query or request) a variety of data from the various other components of central plant controller 402 and/or planning tool 502. In particular, data manager 550 may be configured to retrieve one or more particular asset models from a database of models, shown as asset models 520. Asset models 520 can include any model that represents a particular central plant or building asset (e.g., any of equipment 460 or any of the building devices described with respect to FIGS. 1-3). For example, asset models 520 may include models that represent one or more chillers of chillers 232, heat recovery heat exchangers 226, heating elements 220, etc. In some embodiments, these asset models 520 are mathematical representations of an asset, and executing a model according to a set of parameters may simulate operation of the corresponding asset. In other words, asset models 520 may be predictive models that, when executed, output predicted parameters for a corresponding asset. As an example, asset models 520 may be executed to predict a future resource consumption for an asset.

In some embodiments, asset models 520 include a modified Gordon-Ng model that mathematically represents operations of a chiller asset (e.g., chillers 232). This modified Gordon-Ng model can be utilized to calculate the energy consumption of a single chiller of the central plant based on output temperatures for an evaporator and a condenser of a target chiller. In particular, this model may represent the operations of a water-cooled chiller. The modified Gordon-Ng model is defined as:

$$\left(\frac{1}{COP}+1\right)\frac{T_{CHW,Out}}{T_{CW,Out}}-1 = c_1\frac{T_{CHW,Out}}{\dot{Q}_{evap}} + c_2\frac{(T_{CW,Out}-T_{CHW,Out})}{T_{CW,Out}\dot{Q}_{evap}} + c_3\frac{\left(\frac{1}{COP}+1\right)\dot{Q}_{evap}}{T_{CW,Out}}$$

where COP is the coefficient of performance, $T_{CHW,Out}$ is the leaving evaporator water temperature, $T_{CW,Out}$ is the leaving condenser water temperature, $\dot{Q}_{evap}$ is the heat transfer quantity in the evaporator. It will be appreciated, however, that asset models 520 may include a variation of this modified Gordon-Ng model where $T_{CHW,Out}$ is substituted for $T_{CHW,IN}$, or the input evaporator water temperature, and $T_{CW,Out}$ is substituted for $T_{CW,IN}$, or the input condenser water temperature. In other words, the modified Gordon-Ng model described herein may utilize either input or output temperatures for the evaporator and condenser of a chiller.

In this example, the modified Gordon-Ng model has three coefficients $c_1$, $c_2$, $c_3$ that are solved by regression. In some embodiments, the modified Gordon-Ng model can be rewritten to solve for power, where:

$$P = \dot{Q}_{evap}\left[\frac{(T_{CW,Out}-T_{CHW,Out}) + c_1\frac{T_{CHW,Out}T_{CW,Out}}{\dot{Q}_{evap}} + c_2\frac{(T_{CW,Out}-T_{CHW,Out})}{\dot{Q}_{evap}} + c_3\dot{Q}_{evap}}{T_{CHW,Out} - c_3\dot{Q}_{evap}}\right]$$

Substituting $a_1$, $a_2$, $a_3$, $a_4$ yields:

$$P = \dot{Q}_{evap}\left[\frac{a_1+a_2+a_3+a_4}{b_1}\right], \text{ where } a_1 = T_{CW,Out} - T_{CHW,Out},$$

-continued $$a_2 = \frac{T_{CHW,Out}T_{CW,Out}}{\dot{Q}_{evap}}, a_3 = \frac{(T_{CW,Out} - T_{CHW,Out})}{\dot{Q}_{evap}}, a_4 = \dot{Q}_{evap},$$

and $b_1 = T_{CHW,Out} - c_3 \dot{Q}_{evap}$.

In some embodiments, asset models 520 include a biquadratic model, also representing operations of a chiller asset (e.g., chillers 232). In this regard, the biquadratic model may be an alternative to the Gordon-Ng model presented above. The biquadratic model may use part load ration (PLR) and lift as variables. PLR can be calculated as:

$$PLR = \frac{Q_{evap}}{Q_{design}}$$

where $\dot{Q}_{evap}$ is the cooling delivered by the chiller and $\dot{Q}_{design}$ is the chiller's rated load.

The lift of a chiller is essentially the work that the chiller is doing, and can be calculated as:

LIFT=$(T_{CW,Out} - T_{CHW,Out})$

Alternatively, a lift ratio can be calculated as:

$$LIFT_{ratio} = \frac{(T_{CW,Out} - T_{CHW,Out})}{(T_{CW,Out,design} - T_{CHW,Out,design})}$$

where $T_{CW,Out}$ is the leaving condenser water temperature, $T_{CHW,Out}$ is the leaving chilled water temperature, $T_{CW,Out,design}$ is the design leaving condenser water temperature, and $T_{CHW,Out,design}$ is the design leaving chilled water temperature.

Solving the biquadratic chiller model for power, P, yields:

$P=c_1+c_2PLR+c_3LIFT+c_4PLR*LIFT+c_5PLR^2*LIFT+c_6PLR*LIFT^2+c_7PLR^2*LIFT^2+c_8LIFT^2+c_9PLR^2$ which can be simplified, in some embodiments, to:

$P=c_1+c_2PLR+c_3LIFT+c_4PLR*LIFT+c_5PLR^2*LIFT+c_6LIFT^2$

It will also be appreciated that, in some embodiments, the biquadratic chiller model can be solved for power, P, based on $LIFT_{ratio}$, as shown above. For example, the simplified biquadratic chiller model can be simplified to:

$P=c_1+c_2PLR+c_3LIFT_{ratio}+c_4PLR*LIFT_{ratio}+c_5PLR^2*LIFT_{ratio}+c_6LIFT_{ratio}^2$ In some embodiments, asset models 520 include a steam-driven chiller model that represents the operations of a steam-driven chiller, in particular. The steam-driven chiller model may be alternate, modified version of the Gordon-Ng model described above. In particular, a first variable corresponding to input steam mass flow rate may be converted into steam power using an additional steam turbine model with two coefficients. The leaving condenser water temperature can also be calculated using an inlet temperature, a cooling load, and the steam power estimate for a particular steam-driven chiller. A power estimate for a steam-driven chiller can be calculated as:

$$\dot{P}_{steam} = \frac{\left(\dot{m}_{steam} - \left(\frac{STc_2}{1000}\right)\right)}{STc_1}$$

where $\dot{m}_{steam}$ is the input steam mass flow and $STc_2$ and $STc_1$ are coefficients for the model. From this equation, heat transfer in a condenser of the steam-driven chiller can be calculated as:

$\dot{Q}_{cond} = \dot{P}_{steam} + \dot{Q}_{evap}$ and the leaving condenser water temperature is calculated as:

$$T_{CW,Out} = T_{CW,In} + \left(\frac{\dot{Q}_{cond}}{\rho c_p}\right)$$

The modified Gordon-Ng model for the steam-driven chiller can then be solved using $\dot{P}_{steam}$ by:

$$\left(\frac{\dot{P}_{steam}}{\dot{Q}_{evap}} + 1\right)\frac{T_{CHW,Out}}{T_{CW,Out}} - 1 =$$

$$c_1\frac{T_{CHW,Out}}{\dot{Q}_{evap}} + c_2\frac{(T_{CW,Out} - T_{CHW,Out})}{T_{CW,Out}\dot{Q}_{evap}} + c_3\frac{\left(\frac{\dot{P}_{steam}}{\dot{Q}_{evap}} + 1\right)\dot{Q}_{evap}}{T_{CW,Out}}$$

In some embodiments, asset models 520 can include a model representing operations of an air-cooled chiller. In such embodiments, the model may be similar to the Gordon-Ng model described above for a water-cooled chiller, with the exception that the leaving condenser water temperature is replaced with entering ambient dry-bulb temperature, $T_{OA,In}$, calculated by:

$$\left(\frac{\dot{P}}{\dot{Q}_{evap}} + 1\right)\frac{T_{CHW,Out}}{T_{OA,In}} - 1 =$$

$$c_1\frac{T_{CHW,Out}}{\dot{Q}_{evap}} + c_2\frac{(T_{OA,In} - T_{CHW,Out})}{T_{OA,In}\dot{Q}_{evap}} + c_3\frac{\left(\frac{\dot{P}}{\dot{Q}_{evap}} + 1\right)\dot{Q}_{evap}}{T_{OA,In}}$$

In some embodiments, asset models 520 can include a model representing operations of a steam absorption chiller. In such embodiments, a non-linear solver is used to fit coefficients for a steam absorption chiller to the model to minimize residuals between predicted and actual coefficient of performance (COP) values. The predicted COP for a steam absorption chiller can be calculated by:

$$COP_{predicted} = \frac{\left(\frac{T_{CHW,Out}}{T_{Steam,In}}\right)}{\left(1 + e^{\left(-c_1\left(\frac{\dot{Q}_{evap}}{\dot{Q}_{design}} + c_2\right)\right)}\right)}$$

The actual COP values are then calculated as:

$$COP_{actual} = \frac{\dot{Q}_{evap}}{\dot{P}_{Steam,In}}$$

and the COP residuals are calculated as:

$$COP_{residuals} = COP_{predicted} - COP_{actual}$$

Once the model coefficients are fit, the steam consumption of the chiller can be predicted by:

$$\dot{P}_{Steam,In} = \frac{\dot{Q}_{evap}\left(1 + e^{\left(-c_1\left(\frac{\dot{Q}_{evap}}{\dot{Q}_{design}} + c_2\right)\right)}\right)}{\left(\frac{T_{CHW,Out}}{T_{Steam,In}}\right)}$$

In some embodiments, asset models 520 can include a model representing operations of a double bundle heat recovery chiller. A double bundle heat recovery chiller includes two "bundles," meaning there are two water loops through the condenser. Energy conservation in a double bundle heat recovery chiller is defined as:

$$\dot{Q}_{cond} = P + \dot{Q}_{evap}$$

In general, one of the water loops is a condenser loop and the other is a hot water loop, so the energy conservation equation can be rewritten as:

$$\dot{Q}_{cond} = \dot{Q}_{CW} + \dot{Q}_{HW}$$

Substituting the written equation into the original energy conservation equation yields:

$$\dot{Q}_{CW} + \dot{Q}_{HW} = P + \dot{Q}_{evap}$$

In general, double bundle heat recovery chillers are designed for high lift and are intended to produce two hot water outputs in addition to a cold water output. In this regard double bundle heat recovery chillers typically have two modes of operation. The first mode of operation is the same as a heat recovery chiller, where a hot water loop flows and condenser water does not flow. The hot water flow is used for the leaving condenser water temperature in a Gordon-Ng model (e.g., similar to the modified Gordon-Ng model describe above with respect to a water-cooled chiller) as:

$$P = \dot{Q}_{evap} \left[ \frac{(T_{HW,Out} - T_{CHW,Out}) + c_1 \frac{T_{CHW,Out} T_{HW,Out}}{\dot{Q}_{evap}} + c_2 \frac{(T_{HW,Out} - T_{CHW,Out})}{\dot{Q}_{evap}} + c_3 \dot{Q}_{evap}}{T_{CHW,Out} - c_3 \dot{Q}_{evap}} \right]$$

Substituting $a_1$, $a_2$, $a_3$, $a_4$ yields:

$$P = \dot{Q}_{evap}\left[\frac{a_1 + a_2 + a_3 + a_4}{b_1}\right] \text{ where } a_1 = T_{HW,Out} - T_{CHW,Out},$$

$$a_2 = \frac{T_{CHW,Out} T_{HW,Out}}{\dot{Q}_{evap}}, a_3 = \frac{(T_{HW,Out} - T_{CHW,Out})}{\dot{Q}_{evap}}, a_4 = \dot{Q}_{evap},$$

$$\text{and } b_1 = T_{CHW,Out} - c_3 \dot{Q}_{evap}.$$

In the second mode of operation, both the hot water and the condenser water loops have flow. In this case, a capacity of the condenser is determined by a capacity of each bundle, and a set of nonlinear equations (not shown) can be used to solve for these capacity values.

In some embodiments, asset models 520 includes a heat pump chiller model, representing the operations of a heat pump chiller. In contrast to other types of chillers (e.g., water-cooled chillers), control variables for a heat pump chillers typically include condenser leaving hot water temperature. This type of chiller produces hot water, thereby operating in an opposing manner to a water-cooled chiller that produces cold water controlled to a setpoint. The capacity of an evaporator of a heat pump chiller can be modeled by:

$$\dot{Q}_{evap} = \left[\frac{\frac{(\dot{Q}_{cond} T_{CHW,Out})}{T_{HW,Out}} - c_1 T_{CHW,Out} - c_2\left(1 - \frac{T_{CHW,Out}}{T_{HW,Out}}\right)}{\left(1 + c_3 \frac{\dot{Q}_{cond}}{T_{HW,Out}}\right)}\right]$$

where $a_1 = \frac{(\dot{Q}_{cond} T_{CHW,Out})}{T_{HW,Out}}$, $a_2 = T_{CHW,Out}$, $a_3 = \left(1 - \frac{T_{CHW,Out}}{T_{HW,Out}}\right)$, and $a_4 = \left(1 + c_3 \frac{\dot{Q}_{cond}}{T_{HW,Out}}\right)$.

Substituting these $a_1$, $a_2$, $a_3$, and $a_4$ into the original equation yields:

$$\dot{Q}_{evap} = \left[\frac{a_1 - a_2 - a_3}{a_4}\right]$$

where $\dot{Q}_{evap}$ is the capacity of the evaporator. Once the capacity of the evaporator is solved, the power of the heat pump chiller can be defined as:

$$P = \dot{Q}_{cond} - \dot{Q}_{evap}$$

It will be appreciated that asset models 520 may include any number of additional models, representing operations of any of the various assets (e.g., equipment 460) described herein, and that the models described above represent only a portion of the models that may be include in asset models 520. For example, asset models 520 can also include models that represent other types of assets, such as pumps, heat exchangers, boilers, etc. In some embodiments, asset models 520 can also include models for heat recovery chillers and/or dual compressor chillers. It will also be appreciated that, in some embodiments, operating data for a particular asset or assets can be collected over time, and this operating data can be used to improve or update any of the asset models 520 described herein. For example, some sites may collect appropriate operating data over time, prior to implementing planning system 500, and this historic operations data may be used to dynamically update an asset model prior to execution.

Still referring to FIG. 5A, low level optimizer 432 is also shown to include a prediction generator 552, configured to execute asset models (e.g., asset models 520) to generate predictions regarding the operation of the various assets. For example, prediction generator 552 may execute any of the models described above to generate predictions such as power consumption, which can then be utilized (e.g., by high level optimizer 430) to generate a predicted operating cost for a central plant that includes the particular asset, or to predict an operating cost for one or more particular building assets (e.g., not part of a central plant). In some embodiments, prediction generator 552 also utilizes various input parameters provided by a user (e.g., via client device 522), which may be receive by data manager 550. For example, a user may input number of manufacturer or design-specified parameters of an asset that may be utilized in executing a corresponding model.

Taking the water-cooled chiller model describe above as an example, some current methods of predicting power for an asset involve obtaining a default set of coefficients for the model (e.g., the modified Gordon-Ng model) and scaling the coefficients based on design parameters of one or more chillers, typically due to the lack of actual operating data or manufacturer data for the one or more chillers. In some embodiments, these default coefficients were determined from a constant speed chiller. Scaling can be implemented on the $a_2$, $a_3$, and $a_4$ terms of the modified Gordon-Ng model described above, such that:

$$c_{1,new} = c_1 \frac{\left(\frac{T_{CHW,Out}T_{CW,Out}}{\dot{Q}_{evap}}\right)}{\left(\frac{T_{CHW,Out,new}T_{CW,Out,new}}{\dot{Q}_{evap,new}}\right)}$$

$$c_{2,new} = c_2 \frac{\left(\frac{(T_{CW,Out} - T_{CHW,Out})}{\dot{Q}_{evap}}\right)}{\left(\frac{(T_{CW,Out,new} - T_{CHW,Out,new})}{\dot{Q}_{evap,new}}\right)}$$

$$c_{3,new} = c_3 \frac{\dot{Q}_{evap}}{\dot{Q}_{evap,new}}$$

However, this method of scaling model coefficients can, in some cases, provide inaccurate or low-quality results, particularly when modeling variable speed chillers using a constant speed chiller model, such as the modified Gordon-Ng model described above.

Advantageously, prediction generator 552 may implement a method of executing these asset models by scaling input data rather than scaling the coefficients of a model, as described in greater detail below with respect to FIG. 6. In some embodiments, prediction generator 552 may implement a version of the code reproduced below to scale data for executing the model.

n=length(BaseData.COP);

NewDesignPower=params.DesPower;

NewDesignQevap=params.DesQ;

QevapNew=BaseData.Qevap*(NewDesignQevap)/BaseData.Qevap(1);

COPNew=zeros(n,1);

COPNew(1,1)=NewDesignQevap./NewDesignPower;

COPDelta=(COPNew(1)−BaseData.COP(1));

COPNew(2:end,1)=BaseData.COP(2:end)+ COPDelta.*ones(n−1,1);

PowerNew=zeros(n,1);

PowerNew(1,1)=NewDesignPower;

PowerNew(2:end,1)=QevapNew(2:end,1)./COPNew(2:end,1);

Additionally, prediction generator 552 may be configured to calculate a mean absolute percentage error (MAPE) to evaluate the performance of an executed model. MAPE is an aggregate measure of the goodness of fit to the model, and can be defined as:

$$MAPE = \frac{\sum_1^n \frac{|\hat{y} - y|}{y}}{n}$$

where y is an actual measurement, parameter, or data, $\hat{y}$ is an estimated data point from the model, and n is the number of samples in y and $\hat{y}$. As a rule of thumb, a MAPE less than five is considered a very good fit.

Figure 6:
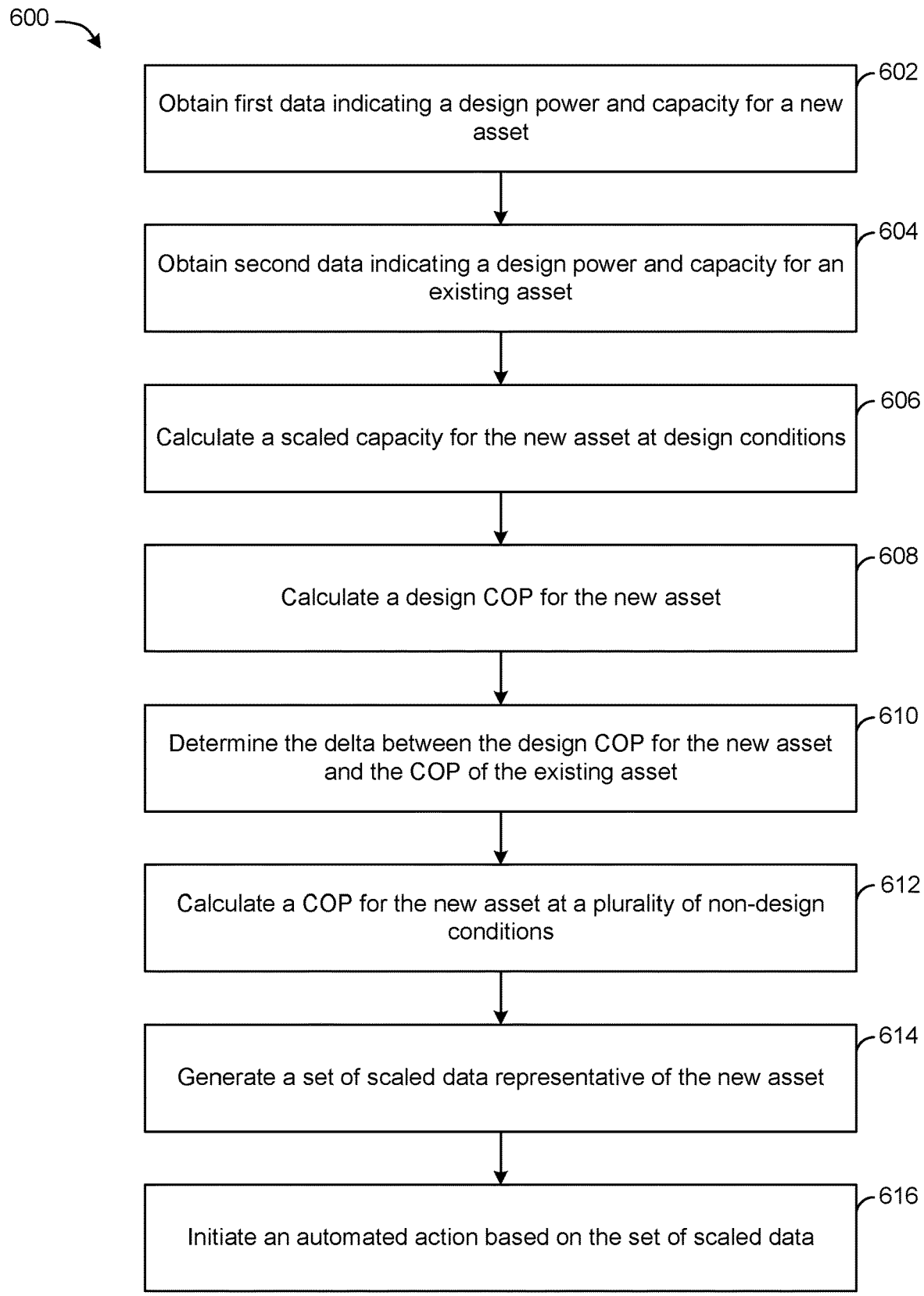
FIG. 6 is a flow diagram illustrating a method of modeling building assets using a scaled data set, according to some embodiments.

Referring now to FIG. 6, a flow diagram illustrating a method 600 of modeling building assets using a scaled data set is shown, according to some embodiments. Method 600 may be implemented by planning tool 502, in some cases, and more particularly may be implemented by low level optimizer 432. For example, method 600 may be implemented by executing the code, reproduced above with respect to FIG. 5B, using one or more processors (e.g., processor 510). Unlike other methods, such as those described above, method 600 includes scaling various data points to generate a prediction from a model, rather than scaling coefficients of the model. By implementing method 600, predicted operating parameters for various assets can be estimated or predicted with greater accuracy than other methods.

Additionally, in some embodiments, sufficient historical data (e.g., historical operating data of an existing building asset) is not available and/or is too expensive or difficult to collect prior to executing asset models to generate predictions. In this regard, method 600 may advantageously require fewer input parameters (e.g., design load and power) than other methods, and does not require large amounts of historical data to generate accurate predictions. However, in some cases where operating data for a target building asset is available or when operating data is collected over time, this operating data may be utilized to dynamically update or correct an asset model to generate more accurate predictions.

In some embodiments, method 600 is implemented to predict resource consumption of various assets. A consumed resource can include any type of resource(s) consumed by an asset in order to generate a produced resource. A produced resource can include any type of resource(s) that are produced (i.e., output) by the asset in response to consuming a resource. For example, a chiller may consume regular water and electricity to generate chilled water, a boiler may consume regular water and either electricity or natural gas to generate heated water, etc. In some embodiments, method 600 may be implemented to estimate the power consumption of various types of chillers in a building (e.g., part of a central plant), in particular. The power consumption of these chillers may be utilized to predict operating costs for a central plant or may simply indicate power consumption and costs associated with operating one or more individual devices (e.g., chillers, boilers, pumps, etc.).

In some embodiments, method 600 is implemented to predict a cost savings or a reduction in power consumption due to the replacement or addition of a particular asset. For example, method 600 may be implemented to determine the energy savings due to replacing a current asset (e.g., a chiller) with a newer, larger capacity (i.e., increased resource production), and/or more energy efficient asset (e.g., a new, large capacity chiller). In this manner, users may be able to determine the cost impact of upgrading certain assets. It will be appreciated that certain steps of method 600 may be optional and, in some embodiments, method 600 may be implemented using less than all of the steps.

At step 602, first data indicating a design (i.e., base) power and a design (i.e., base) capacity for a new asset is obtained. The new asset (i.e., a new building asset or a new central plant asset) can be any asset (e.g., any of equipment 460, any of the building devices described with respect to FIGS. 1-3) that can be included in a building, but that is not yet installed (e.g., not in operation) in the building. For example, the new asset may be an asset that a user (e.g., a site manager) wishes to install into a central plant or building. In this regard, the user may utilize planning tool 502, and thereby low level optimizer 432, to predict a resource consumption (i.e., power) and/or operating costs of the central plant with the addition of the new asset.

In some embodiments, the design power and design capacity may correspond to a design condition, which may be a first set of parameters or a point that the power and capacity of the new asset are designed to meet, or a point/parameter that the new asset is rated at. For example, a design condition for a chiller asset may be at 100% load, where the design power and capacity of the chiller (e.g., as listed by the manufacturer) correspond to 100% load. In this example, a power consumption value or COP associated with the chiller may correspond to the power consumption or COP at full load (e.g., 100%). In some embodiments, the design power and capacity are specified by a manufacturer of the asset. In other embodiments, the design power and capacity may be determined through testing (e.g., by operating the asset at certain setpoints, such as 100% load). In some embodiments, such as when the new asset is a chiller, the design power and capacity may correspond to an evaporator of the chiller.

At step 604, second data indicating a design (i.e., base) power and design (i.e., base) capacity for an existing building asset is obtained. In some embodiments, the second data also includes power and capacity values for the existing building asset at a plurality of operating points. For example, the second data may include a data set of power, capacity, and other operating parameters for the existing building asset that is collected over time, and at in a variety of conditions. The existing asset may be any asset currently installed or operational in a central plant, BMS, building, etc. For example, the existing asset may be a chiller currently installed in a central plant, whereas the new asset may be a new chiller that is being evaluated to replace or supplement the existing asset. In some embodiments, a user may wish to upgrade an existing asset to take advantage of increase efficiency, and thereby lower operating costs, of newer equipment, or to meet increased demands. For example, it may be beneficial to replace a small or undersized chiller with a larger unit to more readily meet demands and to lower the average load on the chiller.

At step 606, a scaled capacity for the new asset is calculated at a design condition. As discussed above, the design condition may be a first set of parameters, such as 100% load. The scaled capacity may be calculated based on the design capacity of the new asset, the design capacity of the existing asset, and the capacity of the existing asset at one or more non-design conditions (i.e., parameters). In particular, the scaled capacity for the new asset can be calculated as:

$$Q_{scaled} = Q_{base} \times \frac{Q_{new\_design}}{Q_{base\_design}}$$

where $Q_{base}$ is the non-design capacity of the existing asset, $Q_{new\_design}$ is the design capacity of the new asset, and $Q_{base\_design}$ is the design capacity of the existing asset.

At step 608, a COP is calculated for the new asset at the design condition. The COP may be calculated based on the design capacity and power of the new asset. In some embodiments, the COP is calculated as:

$$COP_{new} = \frac{Q_{new\_design}}{P_{new\_design}}$$

where $Q_{new\_design}$ is the design capacity of the new asset and $P_{new\_design}$ is the design power of the existing asset.

At step 610, a delta between the COP of the new asset and a COP of the existing asset is determined by subtracting the COP of the new asset at design conditions, calculated at step 608, with the COP of the existing asset. In some embodiments, the COP of the existing asset is a known value (e.g., provided by a manufacturer) or is calculated based on the design capacity and design power of the existing asset.

At step 612, a COP is calculated for the new asset at a plurality of non-design conditions. The COP at non-design conditions may also be referred to as a scaled COP for the new asset. Non-design conditions may include any number of points or parameters other than the design condition. For example, a non-design condition for a chiller may be any load value other than full load (i.e., 100%). In this example, a load of 80% would be a non-design value. The scaled COP can be calculated as:

$$COP_{scaled} = COP_{base} COP_{\Delta}$$

where $COP_{base}$ is the COP of the existing asset at one or more non-design conditions and $COP_{\Delta}$ is the COP delta calculated at step 612. In some embodiments, a scaled COP is calculated for each of a plurality of non-design conditions. For example, a scaled COP may be calculated at each load value from 10% to 100% load.

At step 614, a set of scaled data for the new asset is generated based on the scaled COP. In some embodiments, the set of scaled data includes scaled COP values for various load values of the new asset, including at the plurality of non-design conditions. In this manner, the set of scaled data may represent the COP of the new asset at the various load values. In some embodiments, the scaled data is used to execute a model of the new asset (e.g., any of asset models 520) to predict a power consumption for the new asset at the plurality of non-design conditions, or to predict other operational parameters of the new asset. For example, in some cases, a model of the new asset may be executed using the scaled data set to initiate or modify operations of the new asset (e.g., by adjusting setpoints). In some embodiments, the scaled data set is represented as a subplant curve for a subplant associated with the new asset, or as a curve for the asset itself.

In some embodiments, predicted power consumption may be calculated based on the scaled data set associated with the new asset at the plurality of non-design conditions. In particular, the power for the new asset is a calculated as:

$$P_{new} = \frac{Q_{scaled}}{COP_{scaled}}$$

where $Q_{scaled}$ is the scaled capacity of the new asset (e.g., calculated at step 606) and $COP_{scaled}$ is the scaled COP calculated at step 612. In some embodiments, the power consumption of the new asset is calculated at each of a plurality of non-design condition, similar to the scaled COP. For example, a power value for a chiller may be calculated at a plurality of load values outside of the design load value (e.g., other than 100% load).

In some embodiments, the scaled data set may be transmitted to high level optimizer 430 for additional processing. For example, high leveler optimizer 430 may determine an operating cost associated with the various power values and/or may incorporate the scaled data into an optimization or simulation of an entire central plant. In some embodiments, a model of the new asset is executed by low level optimizer 432 using the scaled data set and at a plurality of simulated loads to generate a subplant or equipment curve (e.g., as described above with respect to FIGS. 4 and 5A). In some such embodiments, the subplant or load curve, and/or predicted power consumption values, may subsequently be transmitted to high level optimizer 430 for simulating and/or operating a central plant.

At step 616, an automated action is initiated based on the scaled data set. In some embodiments, the automated action is a simulated action, such as initiating a simulation of a central plant or a subplant (e.g., using an asset model). For example, the scaled data set may be used to simulate operations of the central plant and/or particular equipment in the central plant (e.g., the new asset), and the automated action may be initiated within the simulation to predict the effects of the action (e.g., a change in power consumption of the central plant or asset). In other embodiments, the automated action includes an actual (i.e., real-world) response based on the scaled data.

In some embodiments, the automated action includes generating, modifying, or retrieving (e.g., from asset models 520) a predictive model for the new asset. The predictive model (e.g., one of asset models 520) may define a relationship between the resource consumption and production of the new asset, as described above. In some such embodiments, the automated action can also include executing the predictive model to predict a future resource consumption of the new asset. For example, the modified Gordon-Ng model described above may be executed using a scaled data set for a new asset to predict the power consumption of the new asset at a variety of operating points (i.e., non-design conditions).

In some embodiments, the automated action includes controlling central plant equipment based on the results of executing central plant, subplant, and/or asset model using the scaled data set. For example, the automated action may include adjusting operating setpoints based on predicted operational data for the new asset, the predicted operational data determined based on the scaled data set. The automated action may further include providing the operating setpoints or other control signals to the new asset or equipment associated with the new asset to adjust a physical operation thereof (e.g., increase chilled water output, increase or decrease chilled water temperature, increase hot water output, increase or decrease hot water temperature, charge or discharge thermal energy or electricity, open or close a valve, adjust an actuator position, increase or decrease airflow through a cooling tower, etc.). In some embodiments, the equipment is controlled to meet a predicted future resource consumption based on a predictive model.

In some embodiments, the automated action may include generating a user interface. The user interface may present the results (e.g., the predicted power values) of the execution of an asset model in a graphical format. For example, the user interface may present graphs similar to those shown in FIGS. 7A-7E, which illustrate predicted and/or actual operational values (e.g., power consumption) at a plurality of points (e.g., design and non-design conditions). In some embodiments, the results of method 600 (e.g., the predicted power values) may also be automatically transmitted to a user device via email, text message, notification or pop-up, etc.

In some embodiments, the results of executing an asset model using method 600 may be compared to actual values, such as those recorded over time for the existing asset. In this manner, the predicted power consumption of the new asset may be compared to actual power consumption of an existing asset, to determine energy or cost savings of implemented (e.g., installing) the new asset. In such embodiments, a user interface may be presented (e.g., via client device 522) that presents the results of method 600, along with an analysis of the cost or energy savings. In some embodiments, the predicted power consumption values for the new asset may also be compared with predicted power consumption values for another, different asset. For example, method 600 may be implemented for two different chillers (e.g., different size, type, etc.) to determine the energy or cost savings of utilizing one of the chillers over the other.

Figure 7A:
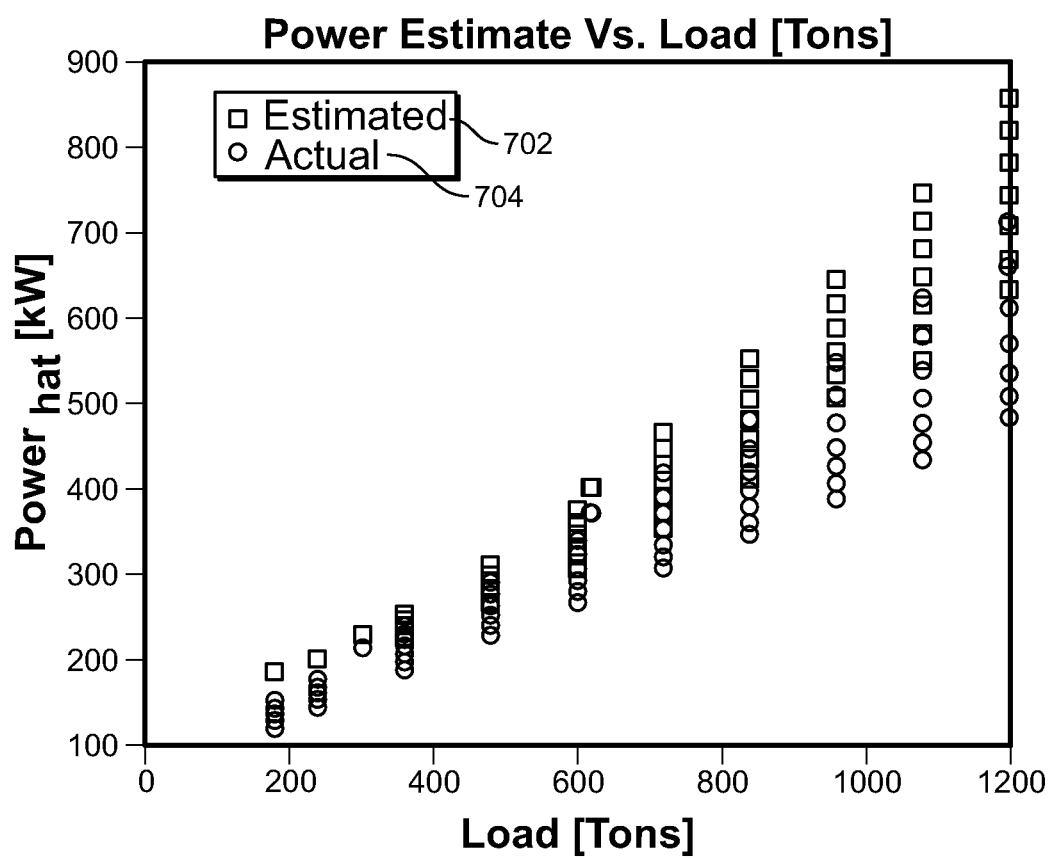
FIGS. 7A-7E are example graphs illustrating power consumption predictions for various assets, according to some embodiments.
Figure 7B:
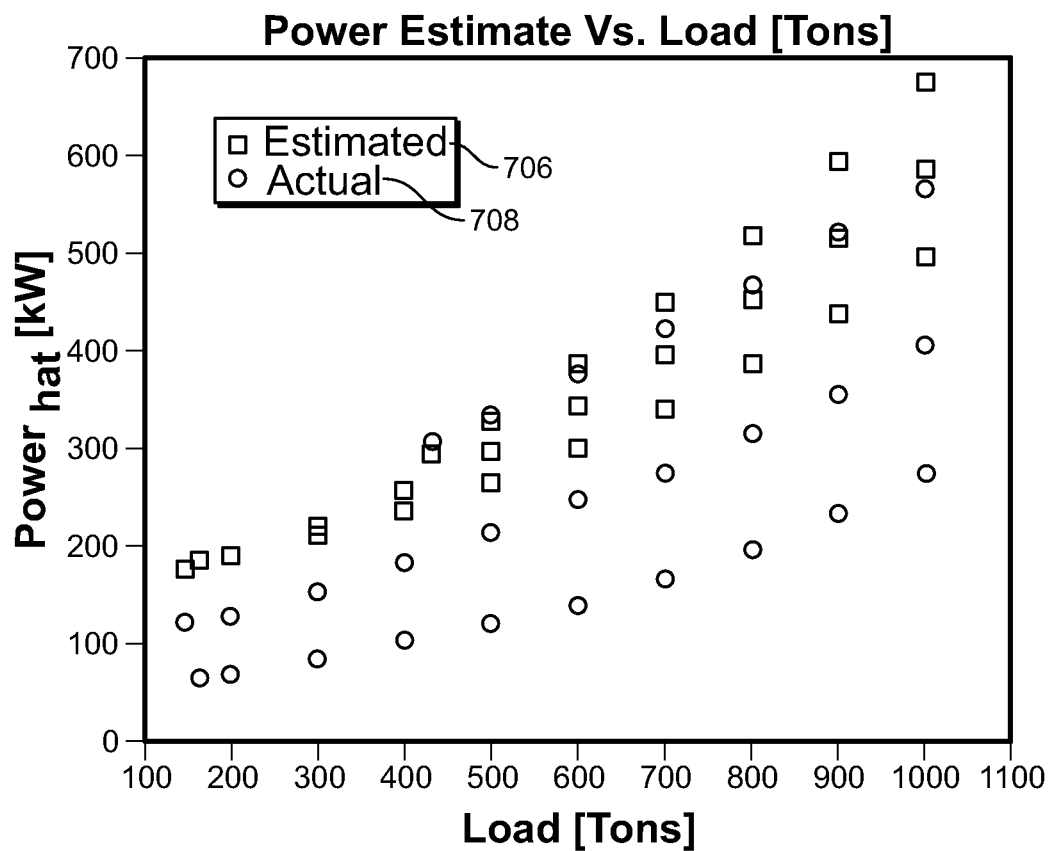
Figure 7C:
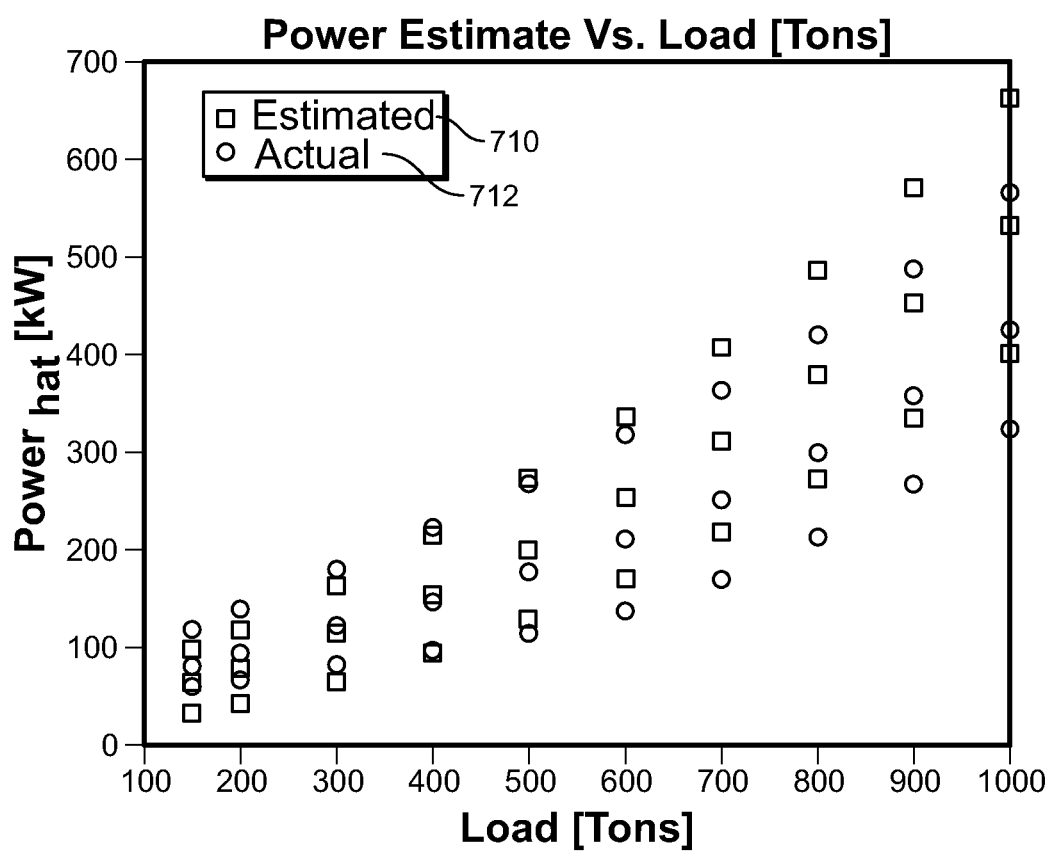
Figure 7D:
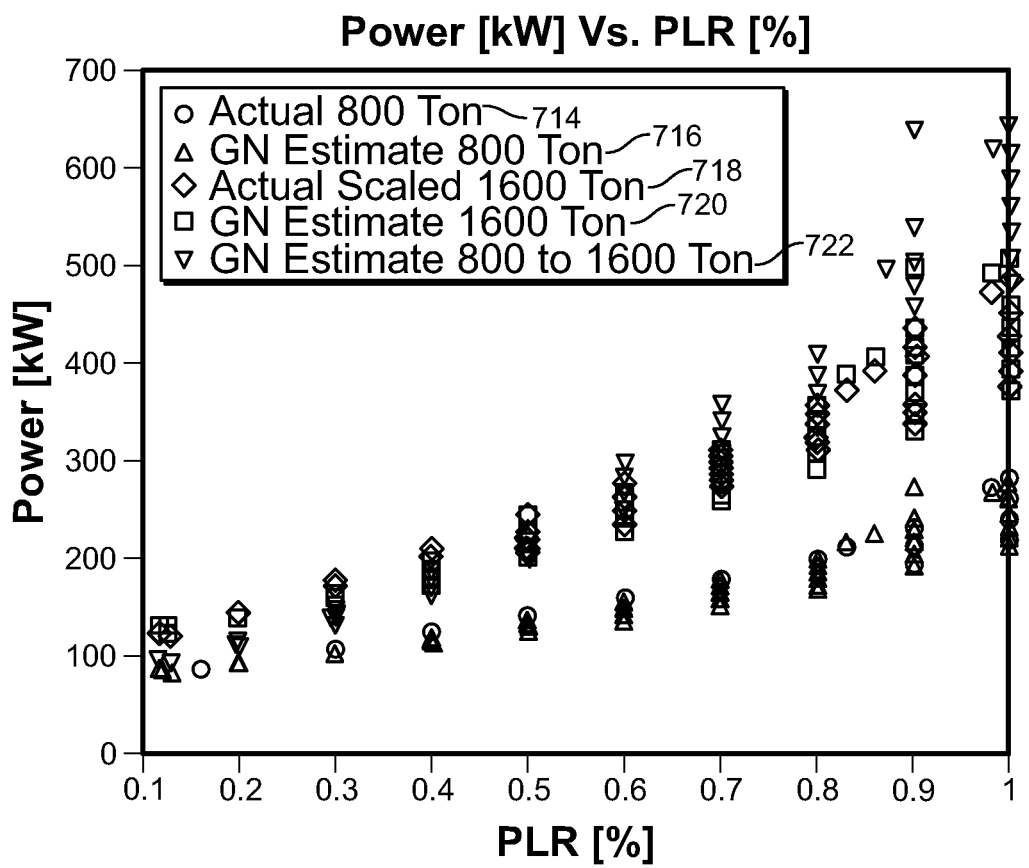
Figure 7E:
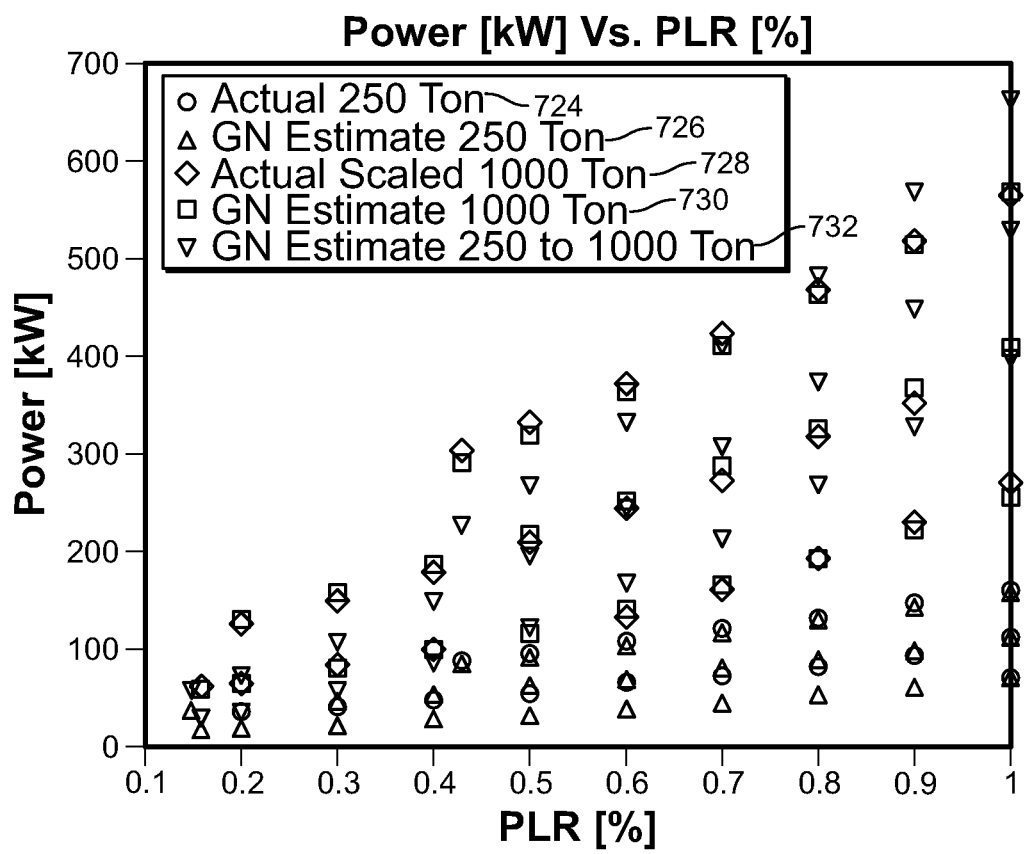

Referring now to FIGS. 7A-7E, example graphs illustrating power consumption predictions for various central plant assets are shown, according to some embodiments. In particular, FIGS. 7A-7C illustrate the results of executing the modified Gordon-Ng model for a water cooled chiller, described above with respect to FIG. 5B, using a method of scaling the coefficients of the model. In contrast, FIGS. 7D and 7E illustrates the results of executing the modified Gordon-Ng model for a water cooled chiller by scaling the input data using method 600.

In particular, FIG. 7A shows data points for an 800-ton constant speed chiller scaled to a 1200-ton constant speed chiller using coefficients corresponding to an 800-ton constant speed chiller model. FIG. 7A includes a first data set 702 corresponding to estimated data points (e.g., load in tons vs. power in kW) and a second data set 704 corresponding to actual data points. It is clear from this example that merely scaling the coefficients of a model corresponding to an 800-ton constant speed chiller does not yield adequate results for a 1200-ton chiller. In fact, using the data points shown in FIG. 7A yields an MAPE of 19.70, far above the desired MAPE of five or less.

Similarly, FIG. 7B shows data points for an 800-ton constant speed chiller scaled to a 250-ton variable speed chiller, using coefficients corresponding to the 800-ton constant speed chiller model. FIG. 7B includes a first data set 706 corresponding to estimated data points (e.g., load in tons vs. power in kW) and a second data set 708 corresponding to actual data points. Again, it is clear that merely scaling the coefficients of a model corresponding to an 800-ton constant speed chiller does not yield adequate results for a 250-ton variable speed chiller, with the estimated and actual values varying greatly. In fact, using the data points shown in FIG. 7B yields a very poor MAPE of 65.37.

FIG. 7C shows data points for a 250-ton variable speed chiller scaled to a 1000-ton variable speed chiller using coefficients corresponding to a 250-ton variable speed chiller model. FIG. 7C also includes a first data set 710 corresponding to estimated data points (e.g., load in tons vs. power in kW) and a second data set 712 corresponding to actual data points. Once again, it is clear from this example that merely scaling the coefficients of a model corresponding to a 250-ton variable speed chiller does not yield adequate results for a 1000-ton variable speed chiller. The data points of FIG. 7C correspond to an MAPE of 18.65, far above the desired MAPE of five or less.

In contrast to FIGS. 7A-7C, FIG. 7D, shows data points plotted on a power vs part load ratio (PLR) graph. A first set of data points 714 corresponds to actual data (e.g., recorded data) for an 800-ton, constant speed chiller. A second set of data points 716 corresponds to predictions at the same load and temperature conditions for each data point after fitting the coefficients of the modified Gordon-Ng model coefficients to the 800-ton chiller data. A third set of data points 718 corresponds to actual 1600-ton, constant speed chiller data. A fourth set of data points 720 includes predictions made using the Gordon-Ng model based on the same load and temperature conditions for each data point. Finally, a fifth set of data points 722 represents power predictions made using the 800-ton chiller data points scaled to a 1600-ton chiller. In this case, FIG. 7D illustrates that it is much more beneficial to fit the scaled 1600-ton chiller data and generate a new set of coefficients (e.g., COP, capacity, etc.), than to try to scale coefficients corresponding to an 800-ton chiller.

FIG. 7E illustrates power vs part load ratio (PLR) for models executed using method 600, described above. A first set of data points 724 corresponds to actual data for a 250-ton variable speed chiller. A second set of data points 726 corresponds to estimated data points based on a model of the 250-ton variable speed chiller. Here, it is clear that the actual data and the estimated data is very close, as expect. A third set of data points 728 corresponds to 250-ton chiller data that is scaled to 1000-ton variable speed chiller data. A fourth set of data points 730 corresponds to predictions made based on the 1000-ton variable speed chiller data. Finally, a fifth set of data points 732 corresponds to predications made using a 250-ton variable speed chiller model that is scaled to a 1000-ton variable speed chiller model using method 600. Again, it is clear that it is much more beneficial to scale the 250-ton variable speed chiller data and generate a new set of coefficients (e.g., COP, capacity, etc.), than to try to scale coefficients corresponding to a 250-ton variable speed chiller.

Additionally, the data points shown in FIGS. 7D and 7E are summarized in Table 1, below, which indicates a MAPE value corresponding to the various methods for executing an asset model. In particular, Table 1 includes MAPE values for both the constant speed chiller of FIG. 7D and the variable speed chiller of FIG. 7E using a direct fit method, a scaled data method (e.g., method 600), and a scaled coefficients method. The direct fit method, in this case, refers to executing a model corresponding to each of the chillers at similar temperature and load conditions. For example, the direct fit method for an 800-ton, constant speed chiller includes executing a model for an 800-ton, constant speed chiller and comparing the predicted values to actual data for an 800-ton, constant speed chiller. The scaled data method, or method 600 described above, includes scaling input data rather than coefficients when executing the model. Finally, the scaled coefficients method includes scaling the coefficients of a first model (e.g., an 800-ton constant speed chiller model) to estimate another, different type of chiller (e.g., a 250-ton, variable speed chiller). Table 1 clearly shows the scaled data method (e.g., method 600) yields much better results than the traditional scaled coefficients method, with MAPE values of 4.96 and 2.98, compared to 19.28 and 23.64 for the scaled coefficients method.

TABLE 1

Summarized results from FIGS. 7D and 7E

| Method | Constant Speed Chiller (FIG. 7D) | Variable Speed Chiller (FIG. 7E) |
|---|---|---|
| Direct Fit | 2.33 | 4.37 |
| Scaled Data Method | 4.96 | 2.98 |
| Scaled Coefficients Method | 19.28 | 23.64 |

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and are considered to be within the scope of the disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A method comprising:
   obtaining a base design resource production of a first building asset and a base resource production data set comprising a base resource production of the first building asset at a plurality of operating points;
   calculating a scaled resource production data set comprising a scaled resource production of a second building asset at the plurality of operating points by scaling the base resource production data set based on a new design resource production of the second building asset relative to the base design resource production of the first building asset;
   generating a resource consumption data set comprising a resource consumption of the second building asset at the plurality of operating points based on the scaled resource production data set;
   generating a model for the second building asset relating the resource consumption of the second building asset and the scaled resource production of the second building asset without requiring a model for the first building asset; and
   initiating an automated action based on the model for the second building asset.

2. The method of claim 1, further comprising:
   obtaining a base coefficient of performance (COP) data set comprising a base COP of the first building asset at the plurality of operating points; and
   calculating a new COP data set comprising a new COP of the second building asset at the plurality of operating points by adjusting the base COP data set.

3. The method of claim 2, wherein adjusting the base COP data set comprises:
   determining a delta between a base COP of the first building asset at base design conditions and a new COP of the second building asset at new design conditions; and
   adjusting the base COP of the first building asset at the plurality of operating points based on the delta between the base COP of the first building asset at base design conditions and the new COP of the second building asset at new design conditions.

4. The method of claim 2, wherein generating the resource consumption data set comprises calculating the resource consumption of the second building asset at the plurality of operating points based on the scaled resource production of the second building asset at the plurality of operating points and the new COP of the second building asset at the plurality of operating points.

5. The method of claim 1, a base design resource consumption and the base design resource production of the first building asset correspond to a resource consumption and a resource production of the first building asset at full load.

6. The method of claim 1, wherein the first building asset and the second building asset comprise at least one of a water-cooled chiller, a heat recovery chiller, a dual-compressor chiller, a steam-driven chiller, an air-cooled chiller, a steam absorption chiller, a double bundle heat recovery chiller, a heat pump chiller, a cooling tower, a boiler, a heater, a steam generator, an air handling unit, or a rooftop unit.

7. The method of claim 1, wherein the automated action comprises using the model for the second building asset to predict a future resource consumption of the second building asset as a function of a future resource production of the second building asset.

8. The method of claim 7, wherein the automated action comprises controlling building equipment based on operational parameters predicted to achieve the future resource consumption or the future resource production.

9. A system comprising:
   one or more memory devices having instructions stored thereon that, when executed by one or more processors, cause the one or more processors to perform operations comprising:
   obtaining a base design resource production of a first building asset and a base resource production data set comprising a base resource production of the first building asset at a plurality of operating points;
   calculating a scaled resource production data set comprising a scaled resource production of a second building asset at the plurality of operating points by scaling the base resource production data set based on a new design resource production of the second building asset relative to the base design resource production of the first building asset;
   generating a resource consumption data set comprising a resource consumption of the second building asset at the plurality of operating points based on the scaled resource production data set;
   generating a model for the second building asset relating the resource consumption of the second building asset and the scaled resource production of the second building asset without requiring a model for the first building asset; and
   initiating an automated action based on the model for the second building asset.

10. The system of claim 9, the operations further comprising:
    obtaining a base coefficient of performance (COP) data set comprising a base COP of the first building asset at the plurality of operating points; and
    calculating a new COP data set comprising a new COP of the second building asset at the plurality of operating points by adjusting the base COP data set.

11. The system of claim 10, wherein adjusting the base COP data set comprises:
    determining a delta between a base COP of the first building asset at base design conditions and a new COP of the second building asset at new design conditions; and
    adjusting the base COP of the first building asset at the plurality of operating points based on the delta between the base COP of the first building asset at base design conditions and the new COP of the second building asset at new design conditions.

12. The system of claim 10, wherein generating the resource consumption data set comprises calculating the resource consumption of the second building asset at the plurality of operating points based on the scaled resource production of the second building asset at the plurality of operating points and the new COP of the second building asset at the plurality of operating points.

13. The system of claim 9, a base design resource consumption and the base design resource production of the first building asset correspond to a resource consumption and a resource production of the first building asset at full load.

14. The system of claim 9, wherein the first building asset and the second building asset comprise at least one of a water-cooled chiller, a heat recovery chiller, a dual-compressor chiller, a steam-driven chiller, an air-cooled chiller, a steam absorption chiller, a double bundle heat recovery chiller, a heat pump chiller, a cooling tower, a boiler, a heater, a steam generator, an air handling unit, or a rooftop unit.

15. The system of claim 9, wherein the automated action comprises using the model for the second building asset to predict a future resource consumption of the second building asset as a function of a future resource production of the second building asset.

16. The system of claim 15, wherein the automated action comprises controlling building equipment based on operational parameters predicted to achieve the future resource consumption or the future resource production.

17. A non-transitory computer-readable medium having instructions stored thereon that, when executed by one or more processors, cause the one or more processors to:
obtain a base design resource production of a first building asset and a base resource production data set comprising a base resource production of the first building asset at a plurality of operating points;
calculate a scaled resource production data set comprising a scaled resource production of a second building asset at the plurality of operating points by scaling the base resource production data set based on a new design resource production of the second building asset relative to the base design resource production of the first building asset;
generate a resource consumption data set comprising a resource consumption of the second building asset at the plurality of operating points based on the scaled resource production data set;
generate a model for the second building asset using the resource consumption data set and the scaled resource production data set; and
initiate an automated action based on the model for the second building asset.

18. The computer-readable medium of claim 17, the instructions further causing the one or more processors to:
obtain a base coefficient of performance (COP) data set comprising a base COP of the first building asset at the plurality of operating points; and
calculate a new COP data set comprising a new COP of the second building asset at the plurality of operating points by adjusting the base COP data set.

19. The computer-readable medium of claim 17, wherein the automated action comprises using the model for the second building asset to predict a future resource consumption of the second building asset as a function of a future resource production of the second building asset.

20. The computer-readable medium of claim 19, wherein the automated action comprises controlling building equipment based on operational parameters predicted to achieve the future resource consumption or the future resource production.

* * * * *